(12) United States Patent
Ishikawa et al.

(10) Patent No.: US 10,910,899 B2
(45) Date of Patent: Feb. 2, 2021

(54) ROTARY ELECTRIC MACHINE

(71) Applicant: Hitachi Automotive Systems, Ltd., Hitachinaka (JP)

(72) Inventors: Toshio Ishikawa, Hitachinaka (JP); Shinji Yamazaki, Hitachinaka (JP); Hiromitsu Okamoto, Hitachinaka (JP); Tomohiro Fukuda, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 289 days.

(21) Appl. No.: 16/098,607

(22) PCT Filed: Mar. 27, 2017

(86) PCT No.: PCT/JP2017/012218
§ 371 (c)(1),
(2) Date: Nov. 2, 2018

(87) PCT Pub. No.: WO2017/195481
PCT Pub. Date: Nov. 16, 2017

(65) Prior Publication Data
US 2019/0149003 A1 May 16, 2019

(30) Foreign Application Priority Data

May 11, 2016 (JP) ................................. 2016-094985

(51) Int. Cl.
*H02K 3/28* (2006.01)
*H02K 3/50* (2006.01)
(Continued)

(52) U.S. Cl.
CPC ............. *H02K 3/28* (2013.01); *H02K 1/2706* (2013.01); *H02K 3/04* (2013.01); *H02K 3/12* (2013.01);
(Continued)

(58) Field of Classification Search
CPC ........ H02K 3/28; H02K 3/50; H02K 2203/09; H02K 2211/03
See application file for complete search history.

(56) References Cited

U.S. PATENT DOCUMENTS

| 4,689,023 A | * | 8/1987 | Strong, III | ............. | H01R 29/00 |
| | | | | | 310/71 |
| 4,950,169 A | * | 8/1990 | Martin | ................... | H01R 29/00 |
| | | | | | 439/44 |

(Continued)

FOREIGN PATENT DOCUMENTS

| CN | 102437663 A | 5/2012 |
| CN | 103023170 A | 4/2013 |

(Continued)

OTHER PUBLICATIONS

Japanese-language Office Action issued in counterpart Japanese Application No. 2018-516377 dated Aug. 6, 2019 with English translation (five (5) pages).

(Continued)

*Primary Examiner* — Robert W Horn
(74) *Attorney, Agent, or Firm* — Crowell & Moring LLP

(57) ABSTRACT

The productivity of a rotary electric machine worsens because the axial length of a stator increases, increasing the overall size, and connecting parts are located on both end sides of a stator core. The rotary electric machine includes: a stator core; a stator winding including a plurality of segment coils; and a connection board that fixes a different-phase connection conductor adapted to connect different phases of the segment coils of the stator winding and a same-phase connection conductor adapted to connect the segment coils of the same phase of the stator winding. The stator winding has, on one side with respect to an axial direction of the stator core, a coil connection section where end portions of the plurality of segment coils are connected (Continued)

to each other, and the connection board is disposed on a side on which the coil connection section is disposed, with respect to the stator core.

12 Claims, 32 Drawing Sheets

(51) Int. Cl.
　　*H02K 3/04*　　　(2006.01)
　　*H02K 1/27*　　　(2006.01)
　　*H02K 3/12*　　　(2006.01)
(52) U.S. Cl.
　　CPC ........... *H02K 3/50* (2013.01); *H02K 2203/03* (2013.01); *H02K 2203/09* (2013.01)

(56) References Cited

U.S. PATENT DOCUMENTS

| | | | | |
|---|---|---|---|---|
| 5,770,902 A * | 6/1998 | Batten | ............ | H02K 5/225 310/71 |
| 6,106,324 A * | 8/2000 | Kwapien | ............ | H02K 3/522 29/596 |
| 6,208,058 B1 | 3/2001 | Taji et al. | | |
| 6,545,379 B2 * | 4/2003 | Gomyo | ............ | H02K 3/522 29/596 |
| 6,552,463 B2 * | 4/2003 | Oohashi | ............ | H02K 3/12 310/184 |
| 6,707,186 B2 * | 3/2004 | Oppitz | ............ | H02K 3/522 310/179 |
| 6,894,410 B2 * | 5/2005 | Kobayashi | ......... | H02K 15/0056 310/239 |
| 6,930,418 B2 * | 8/2005 | Kobayashi | ............ | H02K 3/522 310/214 |
| 7,135,793 B2 * | 11/2006 | Seguchi | ............ | H02K 3/12 310/71 |
| 7,498,702 B2 * | 3/2009 | Migita | ............ | H02K 3/522 310/43 |
| 7,757,929 B2 * | 7/2010 | Ice | ............ | H05K 3/3405 228/180.21 |
| 8,138,644 B2 * | 3/2012 | Kataoka | ............ | H02K 3/522 310/71 |
| 8,749,107 B2 * | 6/2014 | Trammell | ............ | H02K 3/50 310/215 |
| 8,890,380 B2 * | 11/2014 | Andrieux | ............ | H02K 3/522 310/71 |
| 9,362,793 B2 * | 6/2016 | Iki | ............ | H02K 15/0414 |
| 9,362,806 B2 * | 6/2016 | Takasaki | ............ | H02K 3/50 |
| 9,705,375 B2 * | 7/2017 | Yamamoto | ............ | H02K 5/02 |
| 9,812,918 B2 * | 11/2017 | Andrieux | ............ | H02K 3/02 |
| 9,991,757 B2 * | 6/2018 | Haruno | ............ | H02K 3/50 |
| 10,250,096 B2 * | 4/2019 | Nishikawa | ............ | H02K 3/50 |
| 10,340,761 B2 * | 7/2019 | Turnbull | ............ | H02K 3/50 |
| 10,424,983 B2 * | 9/2019 | Takasaki | ............ | H02K 3/50 |
| 10,447,108 B2 * | 10/2019 | Du | ............ | H02K 3/521 |
| 2003/0214190 A1 | 11/2003 | Congdon et al. | | |
| 2005/0253466 A1 | 11/2005 | Seguchi et al. | | |
| 2006/0227455 A1 * | 10/2006 | Tamaoka | ............ | G11B 19/2009 360/99.08 |
| 2009/0127948 A1 | 5/2009 | Shimizu et al. | | |
| 2009/0140596 A1 * | 6/2009 | Kaiser | ............ | H02K 3/12 310/201 |
| 2011/0307911 A1 * | 12/2011 | Yamada | ............ | H05K 3/3405 720/703 |
| 2012/0104885 A1 | 5/2012 | Cominetti et al. | | |
| 2013/0076175 A1 * | 3/2013 | Turnbull | ............ | H02K 3/50 310/71 |
| 2013/0076176 A1 * | 3/2013 | Edrington | ............ | H02K 5/225 310/71 |
| 2013/0257200 A1 * | 10/2013 | Nakayama | ............ | H02K 5/225 310/71 |
| 2014/0077636 A1 | 3/2014 | Jung | | |
| 2019/0149003 A1 * | 5/2019 | Ishikawa | ............ | H02K 1/2706 310/179 |
| 2019/0181712 A1 * | 6/2019 | Aso | ............ | F24F 1/20 |
| 2019/0334403 A1 * | 10/2019 | Aso | ............ | H02K 5/10 |
| 2020/0136462 A1 * | 4/2020 | Hoppner | ............ | H02K 11/0094 |
| 2020/0169137 A1 * | 5/2020 | Tang | ............ | H02K 7/006 |

FOREIGN PATENT DOCUMENTS

| | | |
|---|---|---|
| CN | 103683615 A | 3/2014 |
| JP | 2005-328661 A | 11/2005 |
| JP | 2007-209101 A | 8/2007 |
| JP | 2009-124902 A | 6/2009 |

OTHER PUBLICATIONS

Chinese-language Office Action issued in counterpart Chinese Application No. 201780022675.8 dated Dec. 4, 2019 with English translation (13 pages).

International Search Report (PCT/ISA/210) issued in PCT Application No. PCT/JP2017/012218 dated Aug. 1, 2017 with English translation (two (2) pages).

Japanese-language Written Opinion (PCT/ISA/237) issued in PCT Application No. PCT/JP2017/012218 dated Aug. 1, 2017 (three (3) pages).

* cited by examiner

ROTARY ELECTRIC MACHINE

TECHNICAL FIELD

The present invention relates to a rotary electric machine.

BACKGROUND ART

In recent years, with respect to rotary electric machines for vehicles, a reduction in size and an increase in output have been demanded, and, particularly, an improvement plan based on a stator having a high effect has been proposed.

Therefore, there has been known a rotary electric machine in which for the purpose of enhancing the occupancy rate of a stator winding in the stator, a plurality of segment coils obtained by forming a conductor wire with a tetragonal sectional shape into a U-shaped form are inserted into slots in a stator core from the axial direction of the stator core, terminal end portions of the segment coils are twisted in the circumferential direction at a predetermined angle, and the terminal end portions of the segment coils are mutually joined to configure a distributed winding stator.

However, for configuring a circuit of a stator winding, in addition to the fundamental segment coils composed of U-shaped segment coils at a magnetic pole pitch interval, there are a large number of kinds of segment coils mounted in the stator, such as a segment coil corresponding to an input/output line for connection with the exterior of the motor, a same-phase connecting segment coil for connection in the same phase, and a different-phase segment coil for connection between different phases, and, accordingly, an increase of exclusive-use equipment or the like such as a coil forming machine is also a problem. In addition, it is difficult to change the connection of the stator winding according to the use.

In view of the foregoing, Patent Document 1 proposes a stator structure in which partial coils divided from a head portion of a U-shaped segment coil of a stator winding coil end and extended are incorporated, a terminal for mutually connecting the partial coils is provided, and a connection board integrated by an insulating member and the partial coils are connected.

PRIOR ART DOCUMENT

Patent Document

Patent Document 1: JP-2005-328661-A

SUMMARY OF THE INVENTION

Problem to be Solved by the Invention

In the structure described in Patent Document 1, however, in regard of connection between the connection board and the stator winding, the number of kinds of the segment coils connected to the stator winding is increased, and they are attached on an upper surface in regard of the axial direction of a head portion of the U-shaped segment coil of a coil end portion of the stator, so that the axial length of the stator is increased, resulting in an enlarged stator size. In addition, since mutual connection of segment coil end portions is made on an end portion side of the segment coils and connection between the partial coil and the connection board is made on the segment coil head portion side, the part of connection exists on both end sides of the stator core, so that productivity of the rotary electric machine is worsened.

Means for Solving the Problem

A rotary electric machine according to the present invention includes a stator core, a stator winding including a plurality of segment coils, and a connection board that fixes a different-phase connection conductor adapted to connect different phases of the segment coils of the stator winding and a same-phase connection conductor adapted to connect the segment coils of the same phase of the stator winding. The stator winding has, on one side with respect to an axial direction of the stator core, a coil connection section where end portions of the plurality of segment coils are connected to each other, and the connection board is disposed on a side on which the coil connection section is disposed, with respect to the stator core.

Effect of the Invention

According to the present invention, the number of kinds of segment coils of a stator winding can be minimized, and it is possible to provide a rotary electric machine including a stator which contributes to a reduction in the size of the rotary electric machine and is excellent in productivity.

MODES FOR CARRYING OUT THE INVENTION

Figure 1:
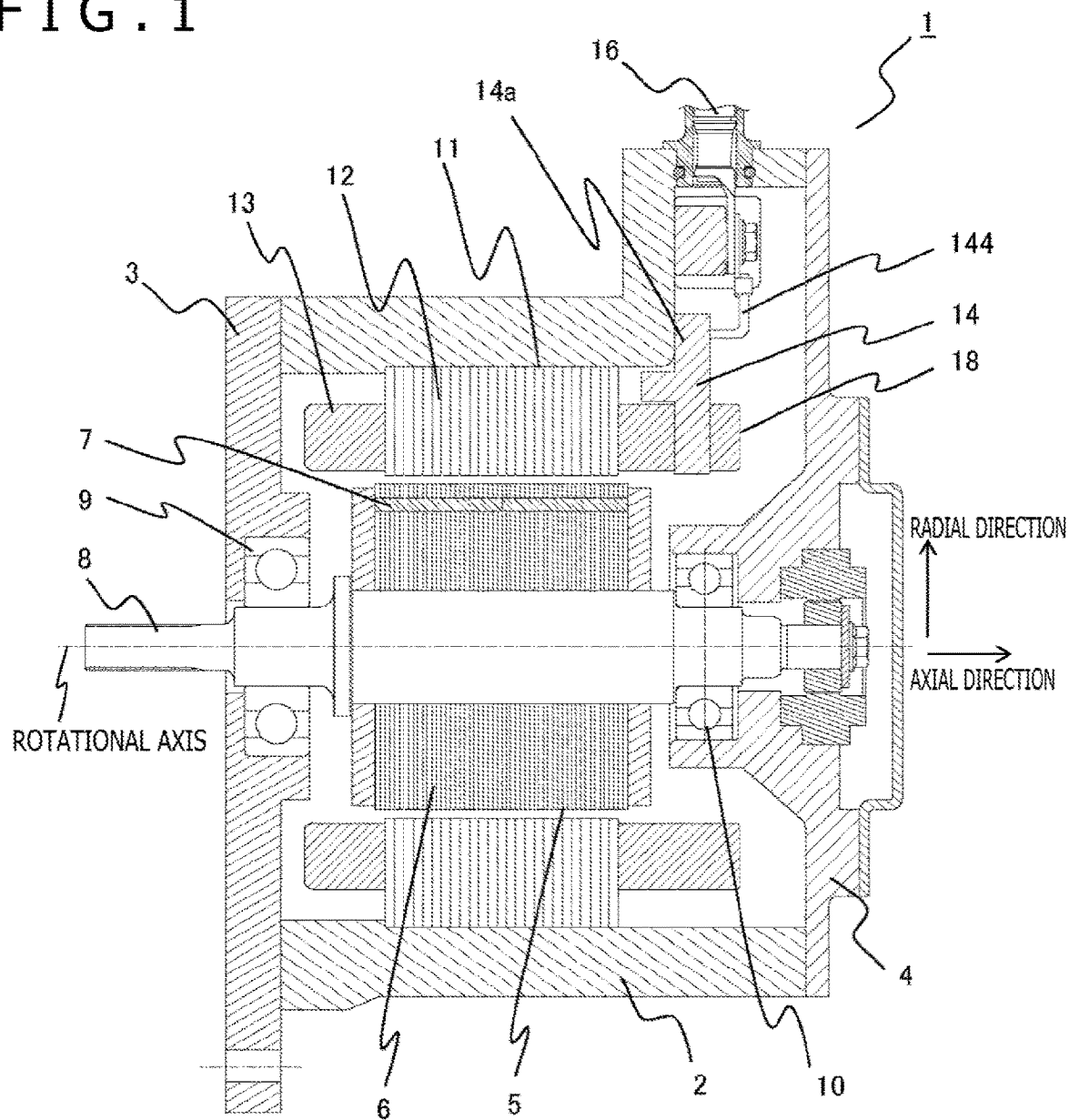
FIG. 1 is a sectional view showing a general configuration of a rotary electric machine.

A mode for carrying out the present invention will be described below, referring to the drawings.

Note that as a rotary electric machine for describing each of the following embodiments, a rotary electric machine for driving an electric vehicle is used. The electric vehicle using the rotary electric machine includes a hybrid electric vehicle (HEV) provided with both an engine and a rotary electric machine, and a genuine electric vehicle (EV) not using an engine but traveling only by a rotary electric machine; since the rotary electric machine described below can be used for both of these types, a rotary electric machine for a hybrid type vehicle will be shown as an example here.

Note that in the following description, the "axial direction" refers to the direction along a rotational axis of a rotary electric machine. The "circumferential direction" refers to the direction along a rotating direction of the rotary electric machine. The "radial direction" refers to the radius vector direction (radial direction) with the rotational axis of the rotary electric machine as a center.

FIG. 1 is a sectional view showing a general configuration of a rotary electric machine 1 according to the present embodiment. In FIG. 1, the rotary electric machine 1 is shown in section, whereby the inside of the rotary electric machine 1 is illustrated.

The rotary electric machine 1 is a permanent magnet incorporating type three-phase synchronous motor. In the rotary electric machine 1, a three-phase AC current is supplied to a stator winding 13 mounted to a stator core 12 from an inverter (not shown) through a cable 16, whereby a rotor 5 is rotated. In addition, when driven by an engine, the rotary electric machine 1 operates as a dynamo to output three-phase AC generated power. In other words, the rotary electric machine 1 has both a function as a motor that generates a rotational torque based on electrical energy and a function as a dynamo that generates electric power based on mechanical energy, and the functions are selectively utilized according to the traveling condition of the vehicle.

In addition, in the rotary electric machine 1 in the present embodiment, the number of magnetic poles of the rotor 5 is eight, the number of phases of the stator 11 is three and the three phases are in Y-connection, and the number of slots in the stator core 12 is 48. The number of conductors in the slot is four, the conductors are aligned in four layers in the radial direction, and they are mounted in the slot in the stator core 12.

The configuration of the rotary electric machine 1 will be described using FIG. 1.

The rotary electric machine 1 has the rotor 5 and the stator 11. The rotor 5 has a rotor core 6 at a central portion of a shaft 8, and a plurality of permanent magnets 7 are disposed at the rotor core 6. The rotor core 6 includes stacked steel sheets obtained by forming an electrical steel sheet of about 0.2 to 0.5 mm in thickness by stamping and stacking the formed electrical steel sheets.

The rotor 5 is disposed on the inner circumference side of, and in the manner of facing, the stator 11, with a slight gap therebetween. The rotor 5 has its shaft 8 inserted in inner rings of a front bearing 9 and a rear bearing 10, thereby being rotatably supported.

A center housing 2 is disposed on the outer circumference side of the stator 11, and fixes the stator 11 by shrinkage fit or the like. Both end portions of the center housing 2 are clamped by a front bracket 3 and a rear bracket 4 in such a manner as to cover the stator 11 and the rotor 5.

The front bearing 9 is mounted to the front bracket 3, the rear bearing 10 is mounted to the rear bracket 4, and the shaft 8 is inserted in the inner circumferential surfaces of the bearings, whereby the rotor 5 is rotatably supported.

Figure 2:
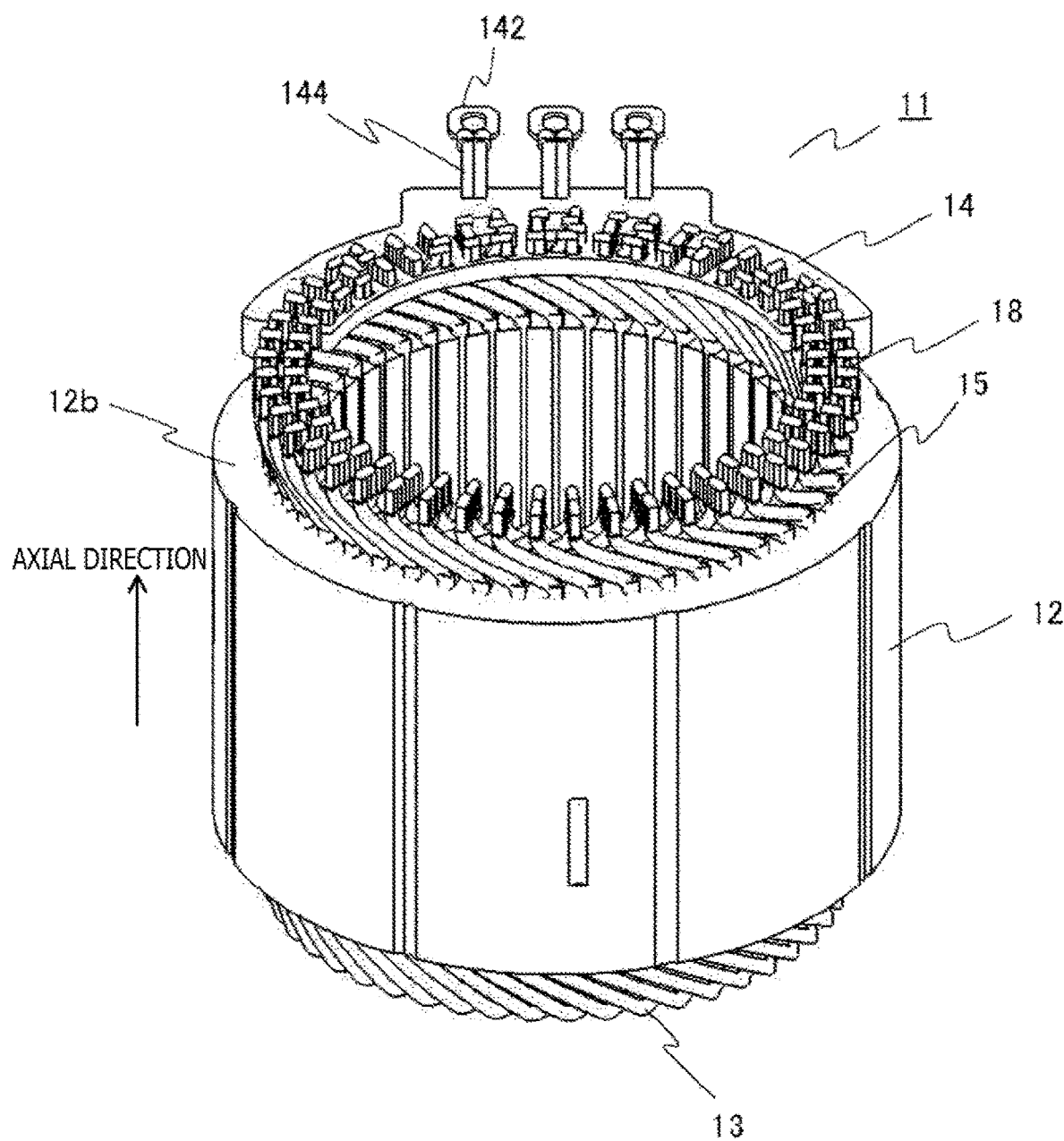
FIG. 2 is a perspective view of a stator.
Figure 3:
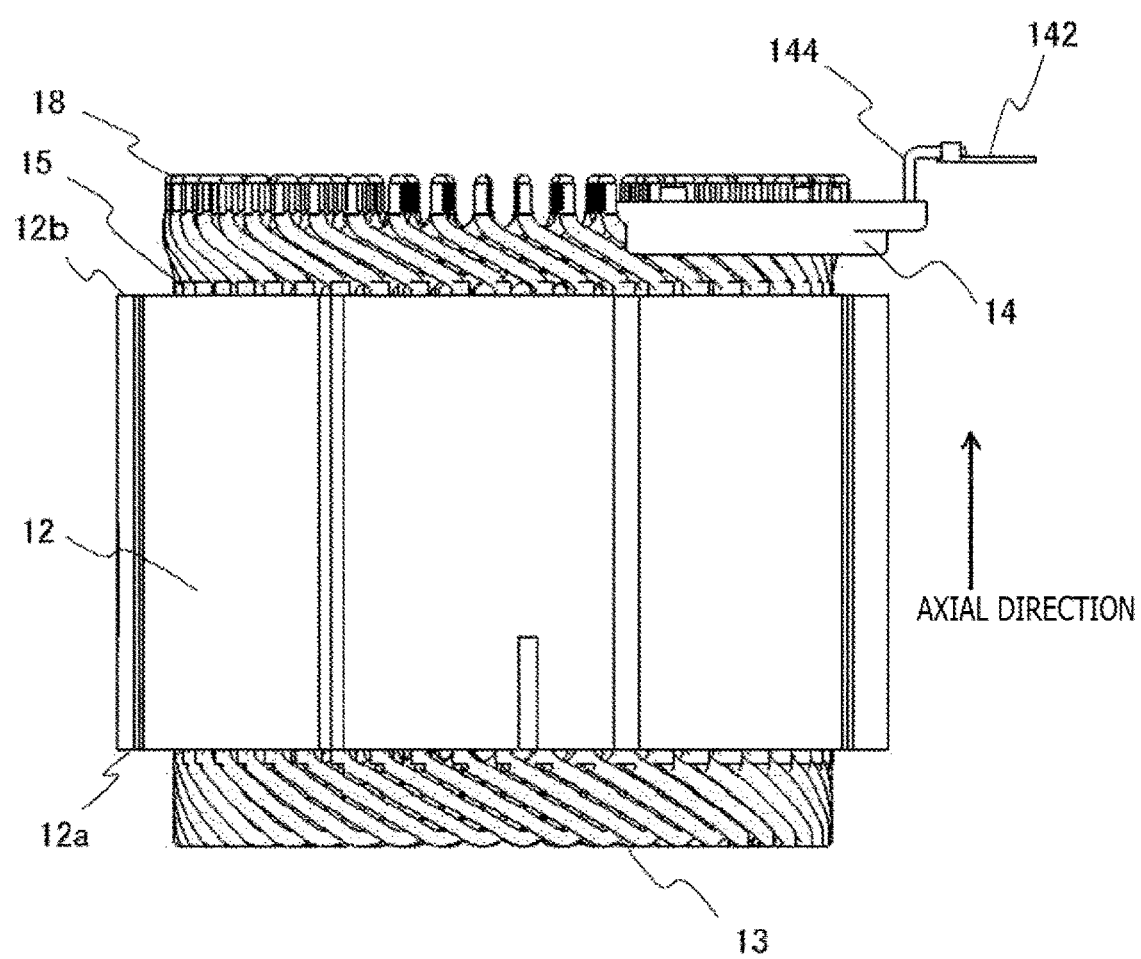
FIG. 3 is a side view of the stator.
Figure 4:
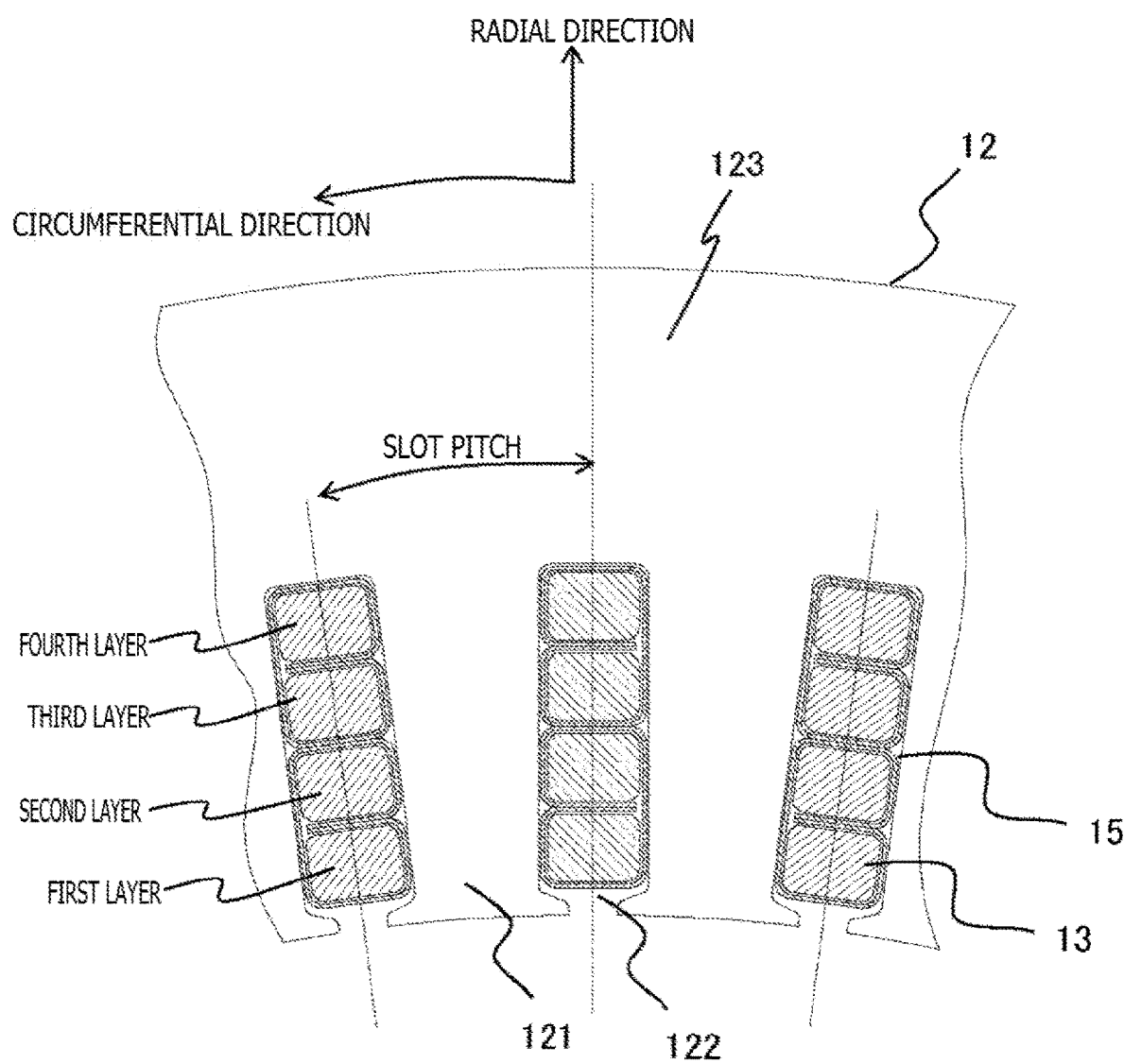
FIG. 4 is a sectional view of a slot portion of the stator.

FIG. 2 is a perspective view of the stator 11, and FIG. 3 is a side view of the stator 11. The stator 11 includes of the stator core 12, the stator winding 13 and a connection board 14. FIG. 4 is a sectional view of a slot portion of the stator core 12. As shown in FIG. 4, the stator core 12 has a structure in which a plurality of annularly formed thin steel sheets are stacked, projecting tooth portions (teeth 121) and slots 122 between the tooth portions are formed on the inner circumference side, and a core back 123 is formed on the radially outer side of the slots 122. The stator winding 13 of each phase is mounted in each of the slots 122. An insulating paper 15 is disposed between the stator core 12 and the stator winding 13, whereby the stator core 12 and the stator winding 13 are electrically insulated, and the stator windings 13 are electrically insulated from each other.

Figure 5:
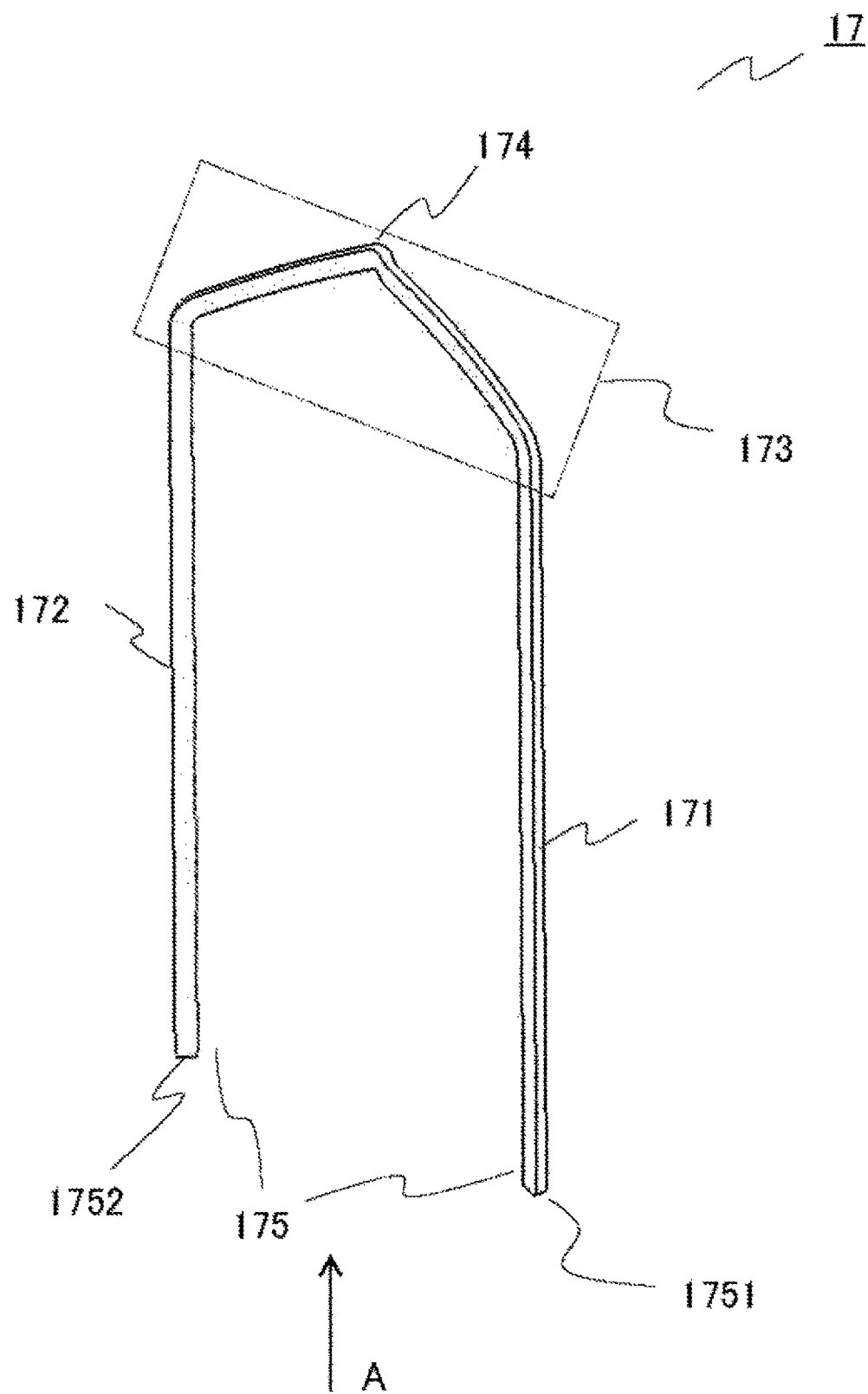
FIG. 5 is a perspective view of a U-shaped segment coil.
Figure 6:
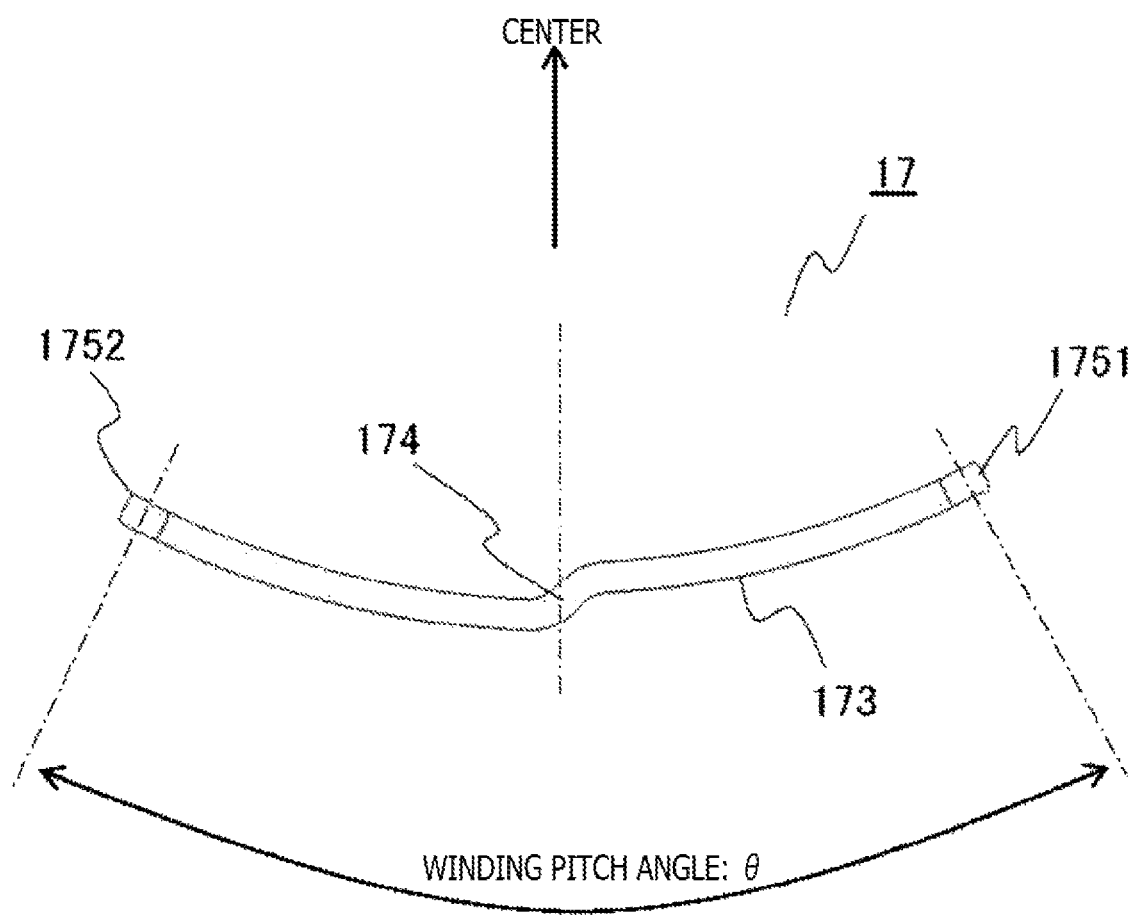
FIG. 6 is a bottom view of the U-shaped segment coil.

FIGS. 5 and 6 show a U-shaped segment coil 17 for configuring the stator winding 13, in which FIG. 5 is a perspective view thereof, and FIG. 6 is a bottom view as viewed from A direction in FIG. 5. The stator winding 13 includes a plurality of U-shaped segment coils 17.

As the U-shaped segment coil 17, there is used a conductor which is substantially tetragonal in sectional shape and an outer periphery of which is covered with an insulating coat. While the U-shaped segment coil 17 is a conductor which is substantially tetragonal in sectional shape and the outer periphery of which is covered with the insulating paper 15 in the present embodiment, a similar effect can be obtained also when the sectional shape is a circle, a hexagon or the like.

As shown in FIGS. 5 and 6, the U-shaped segment coil 17 includes a first rectilinear portion 171 corresponding to a part mounted in the slot 122 of the stator core 12, a second rectilinear portion 172 corresponding to a part mounted in the slot 122 of another stator core 12, and a mount-shaped portion 173 interconnecting the first rectilinear portion 171 and the second rectilinear portion 172, which portions are formed continuously. The U-shaped segment coil 17 has a segment coil head portion 174 as a peak of the mount-shaped portion 173, and a first end portion 1751 of the first rectilinear portion 171 and a second end portion 1752 of the second rectilinear portion 172 on the opposite side. Note that the first end portion 1751 of the first rectilinear portion 171 and the second end portion 1752 of the second rectilinear portion 172 are generically called segment coil end portions 175.

The first rectilinear portion 171 and the second rectilinear portion 172 of the U-shaped segment coil 17 are deviated from each other in radial position. Specifically, the first rectilinear portion 171 is disposed on a radially central side, whereas the second rectilinear portion 172 is disposed on a radially outer side than the first rectilinear portion 171. When explaining in terms of the layout of the slots 122 shown in FIG. 4, in the present embodiment, the first rectilinear portion 171 is located at the position of an odd-numbered layer of a first layer or a third layer, whereas the second rectilinear portion 172 is located at the position of an even-numbered layer of a second layer or a fourth layer.

The first rectilinear portion 171 and the second rectilinear portion 172 are disposed with a predetermined winding pitch angle θ in the circumferential direction; in the present embodiment, the winding pitch angle θ is a slot pitch interval of 7 pitches (52.5°) which is greater than a magnetic pole pitch.

Figure 7:
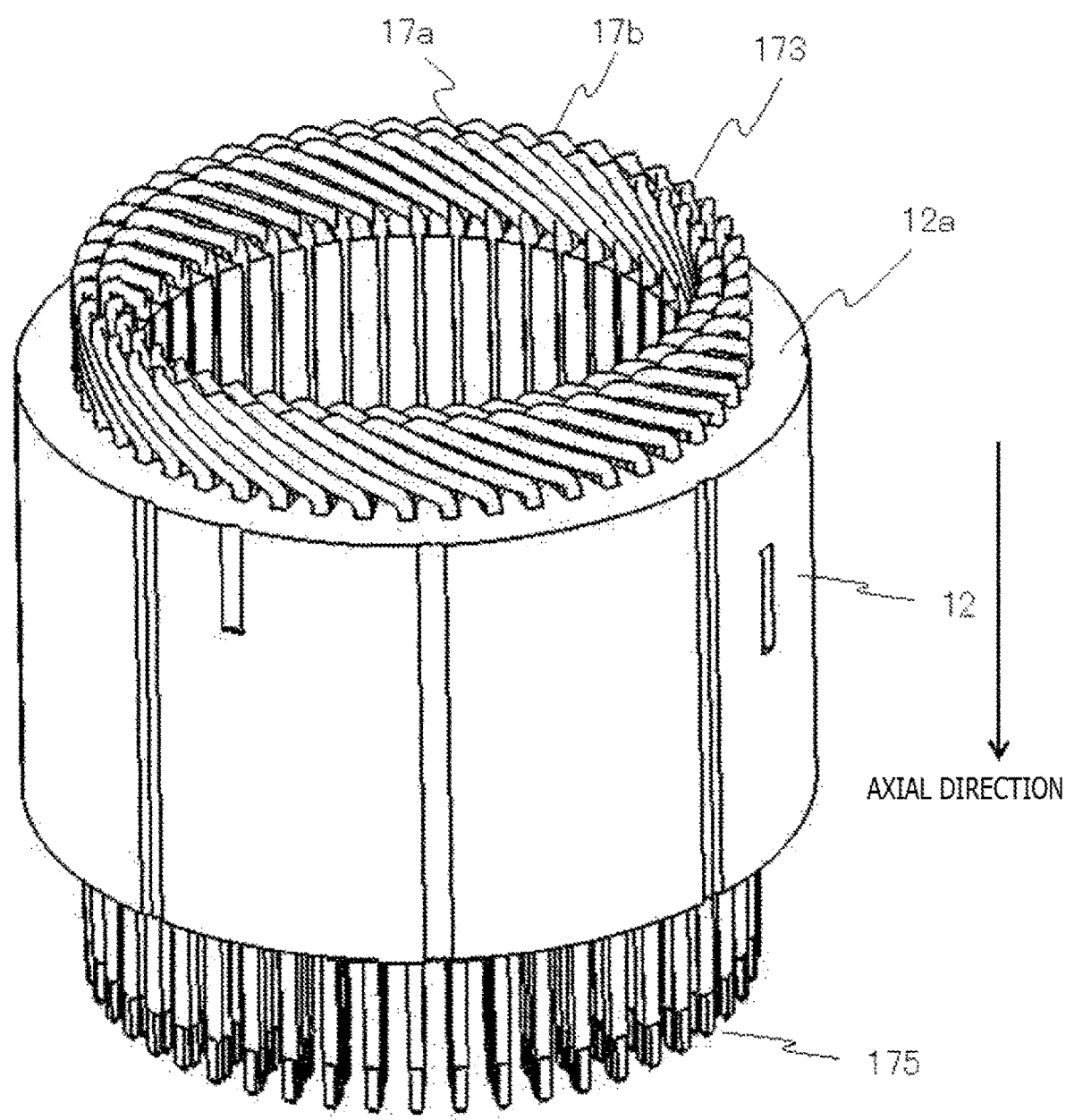
FIG. 7 is a perspective view of the stator as viewed from a segment coil mount-shaped portion.
Figure 8:
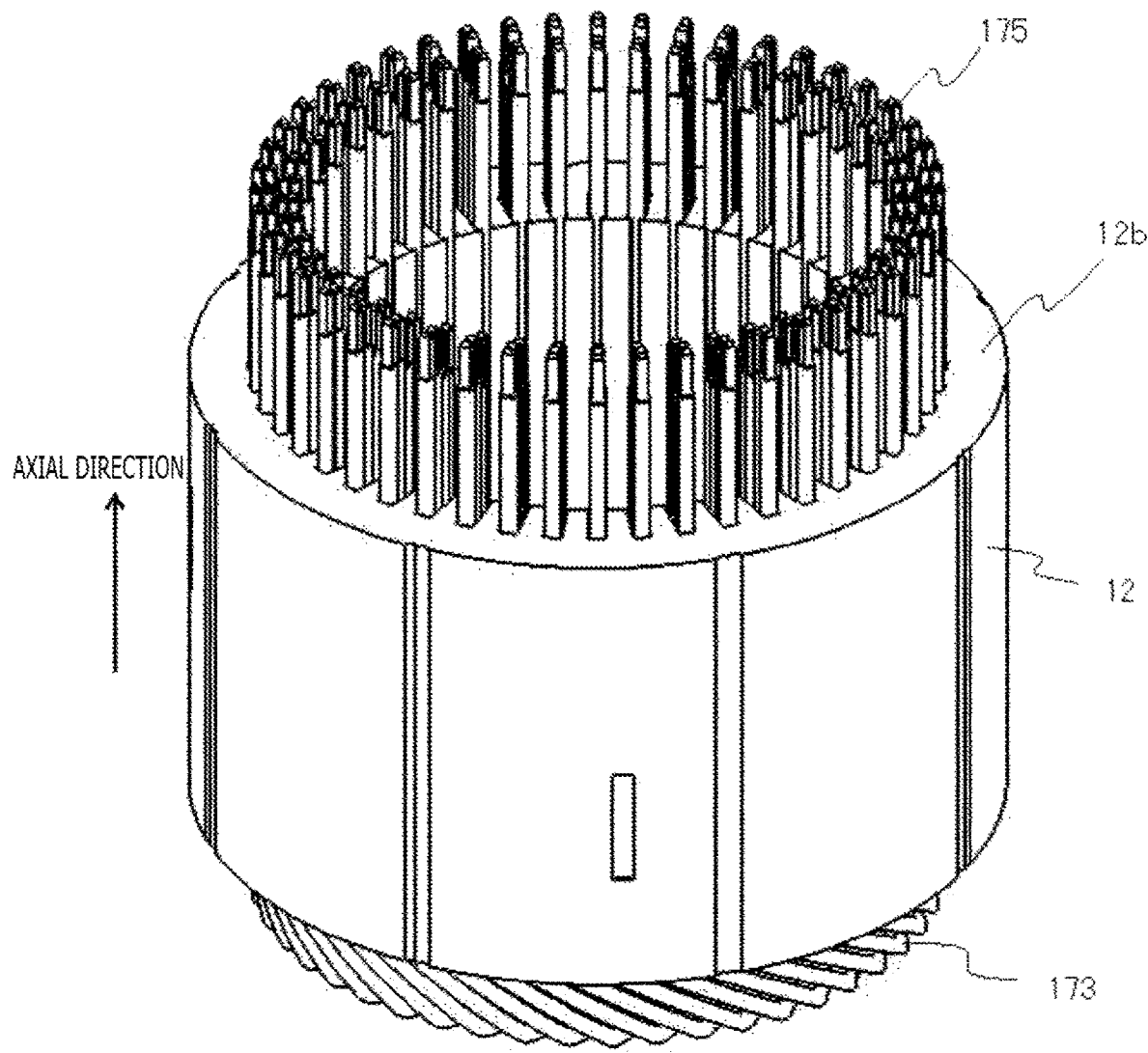
FIG. 8 is a perspective view of the stator as viewed from a segment coil end portion side.

FIG. 7 is a perspective view showing a state in which the U-shaped segment coils 17 are mounted to the stator core 12, as viewed from the mount-shaped portion 173 of the U-shaped segment coil 17, and FIG. 8 is a perspective view showing the same, as viewed from the segment coil end portion 175. As shown in FIGS. 7 and 8, the U-shaped segment coils 17 are inserted in the axial direction from the side of an end portion 12a of the stator core 12.

The U-shaped segment coils 17 include two kinds, namely, inner U-shaped segment coils 17a mounted at the positions of the first layer and the second layer in the slots 122 of the stator core 12, and outer U-shaped segment coils 17b mounted at the positions of the third layer and the fourth layer in the slots 122 of the stator core 12, and they are mounted in the numbers of 48 each in the slots 122 of the stator core 12.

Figure 9:
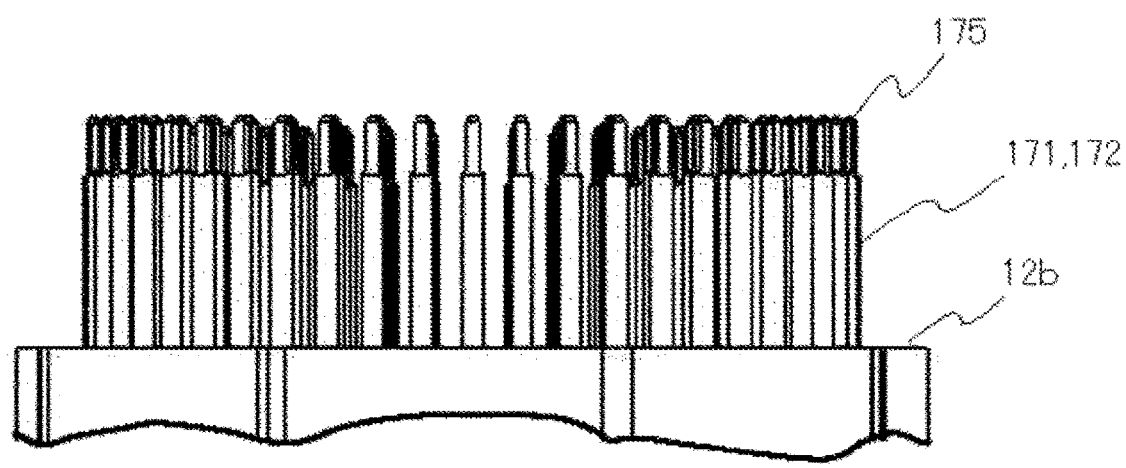
FIG. 9 is a partial side view of the stator with the U-shaped segment coil mounted thereto.
Figure 10:
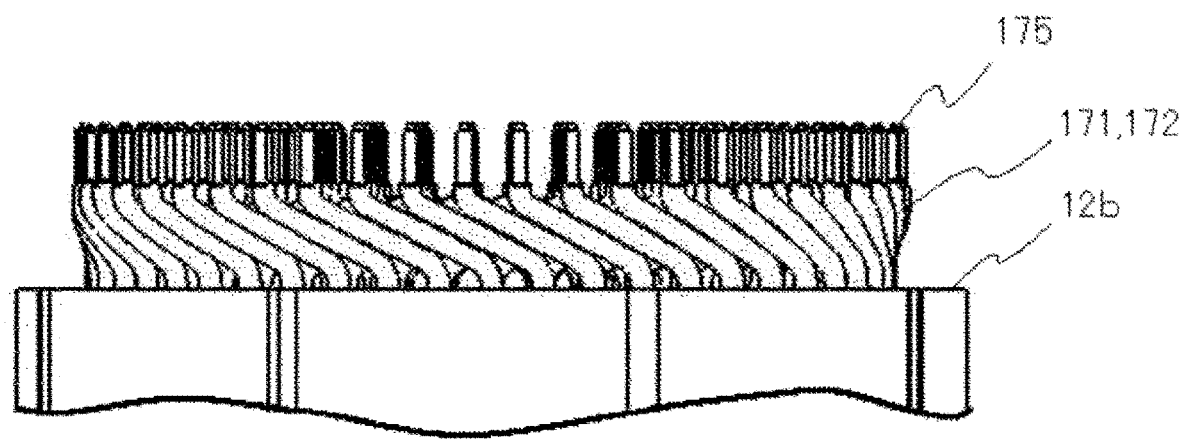
FIG. 10 is a partial side view of the stator in a state in which a segment coil end portion is twisted.

FIG. 9 is a partial side view of the stator 11 in which the U-shaped segment coils 17 are mounted to the stator core 12, and FIG. 10 is a partial side view showing a state in which the segment coil end portions 175 are twisted. Of the U-shaped segment coils 17 mounted to the stator core 12, the U-shaped segment coils 17 in the same phase on a circuit basis are connected, and, for this purpose, the first rectilinear portions 171 and the second rectilinear portions 172 protruded from the end portion 12b of the stator core 12 are twisted at a predetermined angle in the circumferential direction.

Figure 11:
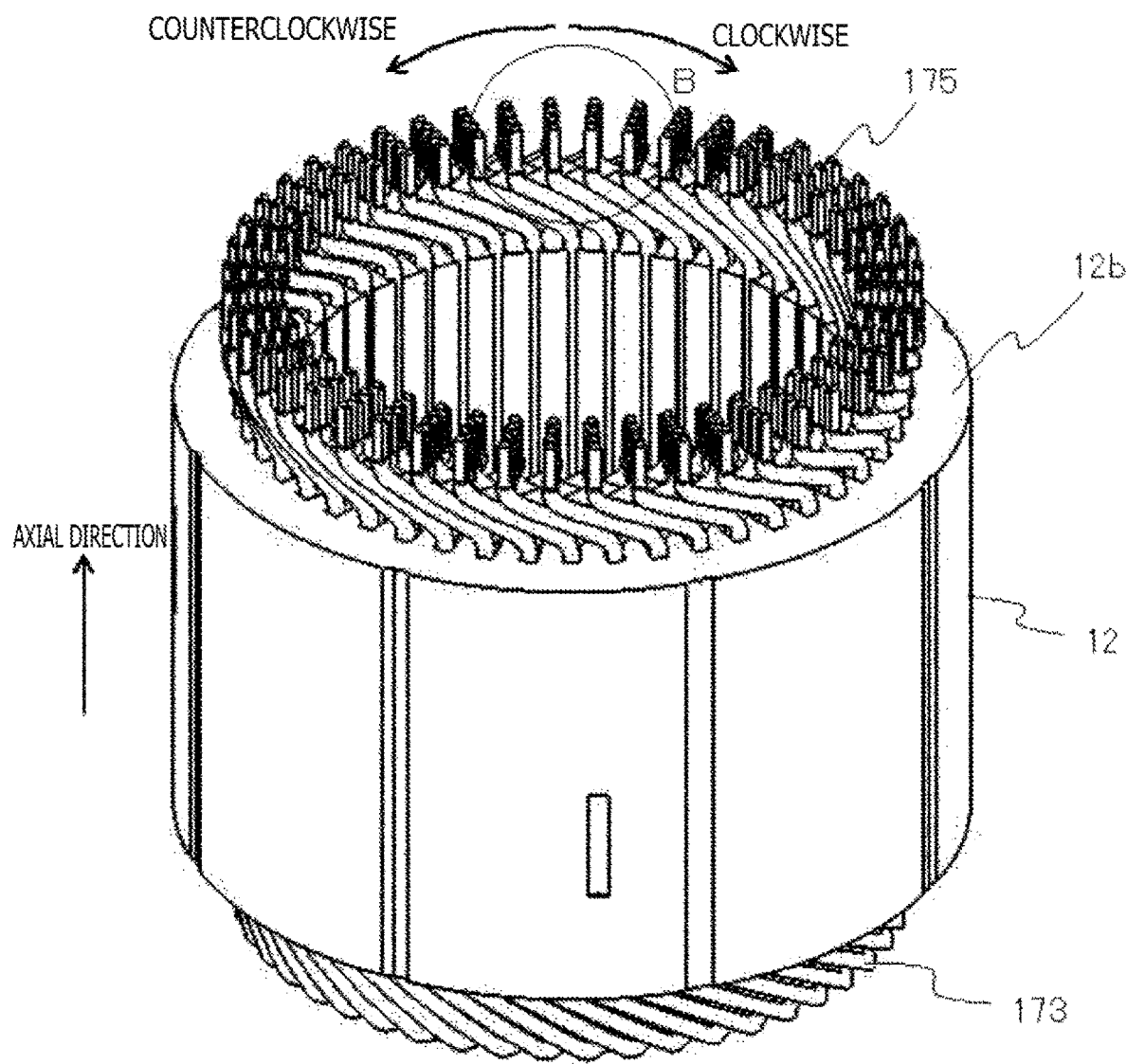
FIG. 11 is a perspective view of the stator, showing the segment coil end portion.
Figure 12:
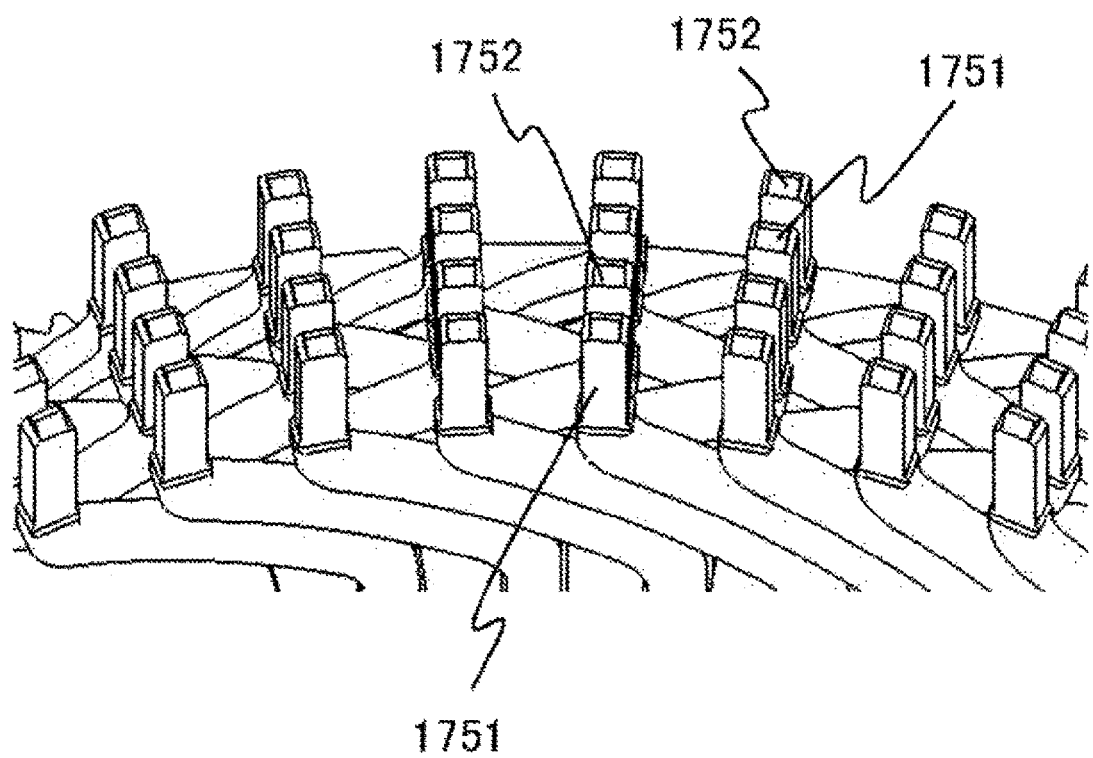
FIG. 12 is a partial enlarged view of the stator.

FIG. 11 is a perspective view of the stator 11, showing the segment coil end portions 175. FIG. 12 is an enlarged view of part B shown in FIG. 11. The first end portion 1751 of the U-shaped segment coil 17 and the second end portion 1752 of the adjacent other U-shaped segment coil 17 are connected, whereby a route extending around in the circumferential direction with reference to the rotational axis of the stator core 12 is formed, thereby configuring a wave-winding stator. The end portion 175 of the U-shaped segment coil 17 passing through the first layer and the third layer in the slot 122 of the stator core 12 is twisted counterclockwise in the circumferential direction at a twisting angle of 2.5 slot pitches (18.75°). The end portion 175 of the U-shaped segment coil 17 passing through the even-numbered layers of the second layer and the fourth layer is twisted clockwise in the circumferential direction at a twisting angle of 2.5 slot pitches (18.75°).

With the end portion 175 of the U-shaped segment coil 17 twisted in the above-mentioned manner, a route passing from the first end portion 1751 of the U-shaped segment coil 17, through the first rectilinear portion 171 in the slot 122 of the stator core 12, the mount-shaped portion 173 and the head portion 174 and passing sequentially through the mount portion 173, the second rectilinear portion 172 in the slot 122 of the stator core 12 and the second end portion 1752 is formed. In other words, a route of 360 degrees in electrical angle is formed by twisting the end portions 175 of the U-shaped segment coil 17.

In the present embodiment, the winding pitch angle θ of the U-shaped segment coil 17 shown in FIG. 6 is 7 slot pitches (52.5°) which is greater than the magnetic pole pitch, and the twisting angle of the U-shaped segment coil end portion 175 is 2.5 slot pitches (18.75°) which is smaller than one half the magnetic pole pitch. However, the winding pitch angle θ of the U-shaped segment coil 17 may be 6 slot pitches (45°) which is equal to the magnetic pole pitch, and the twisting angle of the U-shaped segment coil end portion 175 may be 3 pitches (22.5°) which is one half the magnetic pole pitch. Besides, the winding pitch angle θ of the U-shaped segment coil 17 may be 5 pitches (37.5°) which is smaller than the magnetic pole pitch, and the twisting angle of the U-shaped segment coil end portion 175 may be 3.5 slot pitches (26.25°) which is greater than one half the magnetic pole pitch.

The U-shaped segment coils 17 are twisted in such a manner that the segment coil end portions 175 are at a slot pitch interval of an electrical angle of 360 degrees, irrespectively of the winding pitch interval of the U-shaped segment coils 17, so that the configuration of the connection board 14 which will be described later can be utilized in common without modification.

In the case where the winding pitch angle θ of the U-shaped segment coil 17 is set greater than the magnetic pole pitch, it is possible, at the time of mounting the U-shaped segment coils 17 to the stator 11 and twisting the segment coil end portions 175, to set the twisting angle to be smaller than the magnetic pole pitch. Therefore, the height of a coil end on the segment coil end portion 175 side can be reduced.

On the contrary, in the case where the winding pitch angle θ of the U-shaped segment coil 17 is set smaller than the magnetic pole pitch, the height of the mount-shaped portion 173 of the U-shaped segment coil 17 in the axial direction can be reduced, and, therefore, the height of the coil end on the segment coil mount-shaped portion 173 side can be reduced.

Figure 13:
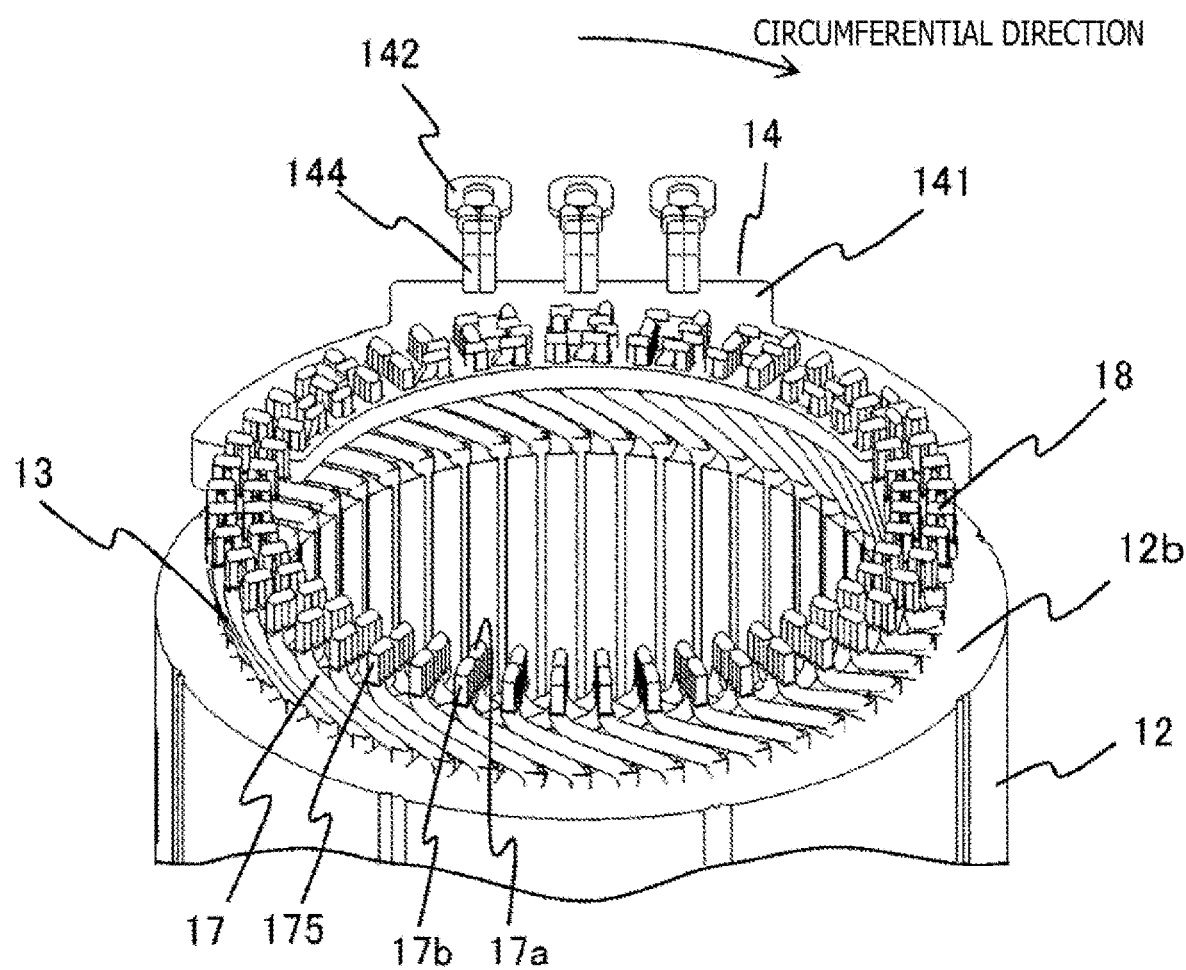
FIG. 13 is a perspective view showing the stator on a connection board side.
Figure 14:
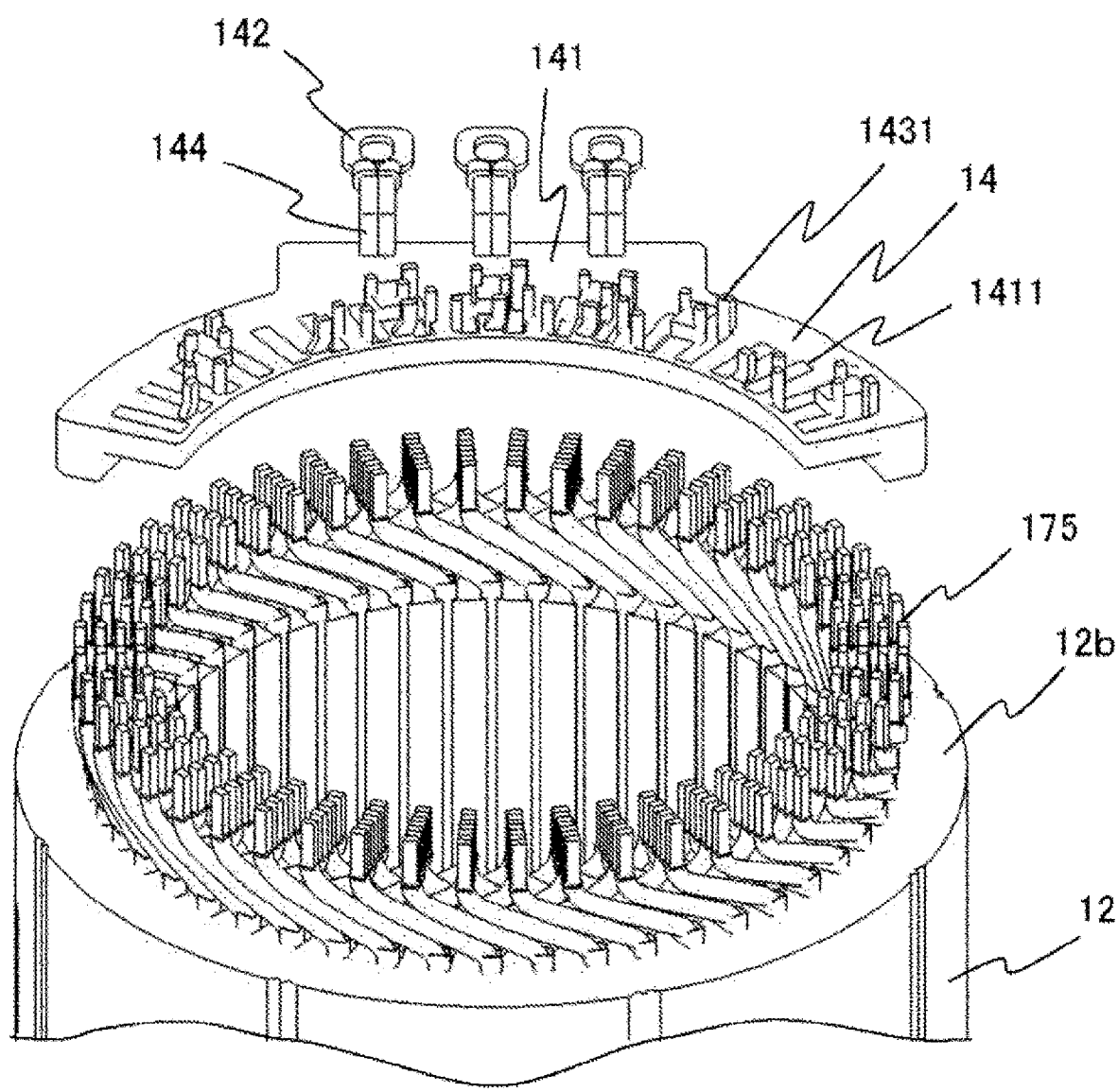
FIG. 14 is a perspective view showing a state in which the stator and the connection board are separated.
Figure 15:
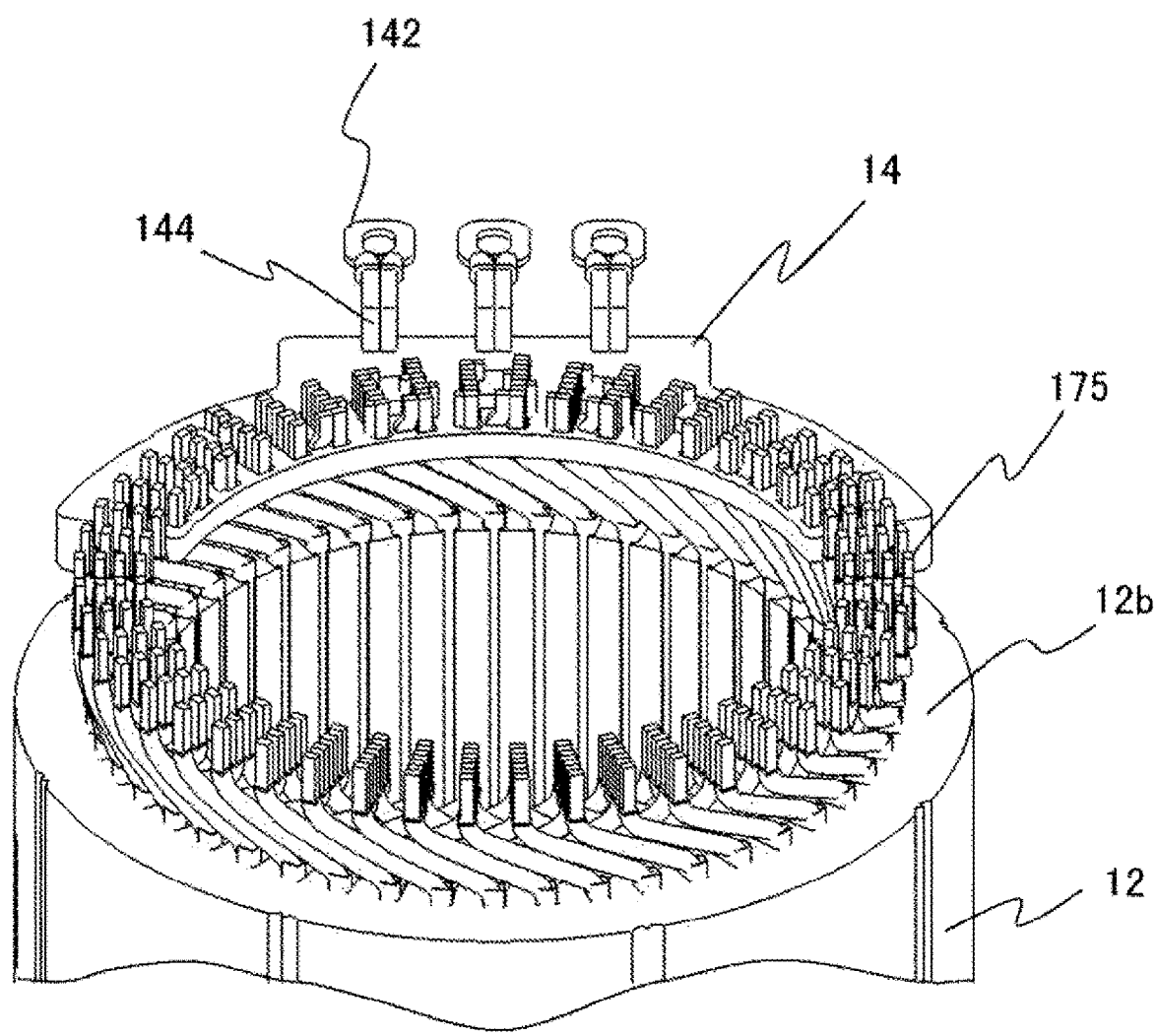
FIG. 15 is a perspective view showing a state in which the connection board is mounted to the stator.

FIG. 13 is a perspective view of the stator 11 as viewed from the connection board 14 side, and FIG. 14 is a perspective view showing a state in the connection board 14 and the stator 11 are separated. FIG. 15 is a perspective view showing a state in which the connection board 14 is mounted to the stator 11.

On the end portion 175 side of the U-shaped segment coil 17 of the stator winding 13, the connection board 14 covered with an insulating member 141 is mounted for the purpose of connection of an electric circuit of the stator 11. The connection board 14 is provided with input/output connection conductors 144 for connecting the exterior of the rotary electric machine 1 and the stator 11. An input/output connection terminal 142 is connected to an end portion of the input/output connection conductor 144. In addition, the connection board 14 is provided with a group of connection conductors, and the U-shaped segment coil end portions 175 and end portions 1431 of the group of connection conductors are connected.

The group of connection conductors includes same-phase connection conductors 145 (see FIG. 17) for connection in the same phase, and different-phase connection conductors 146 (see FIG. 21, corresponding to a neutral point because of a Y-connection in the present embodiment) for connection of different phases. In the group of connection conductors, these connection conductors are fixed at predetermined intervals for electrical insulation in the connection board 14 including the insulating member 141.

Figure 16:
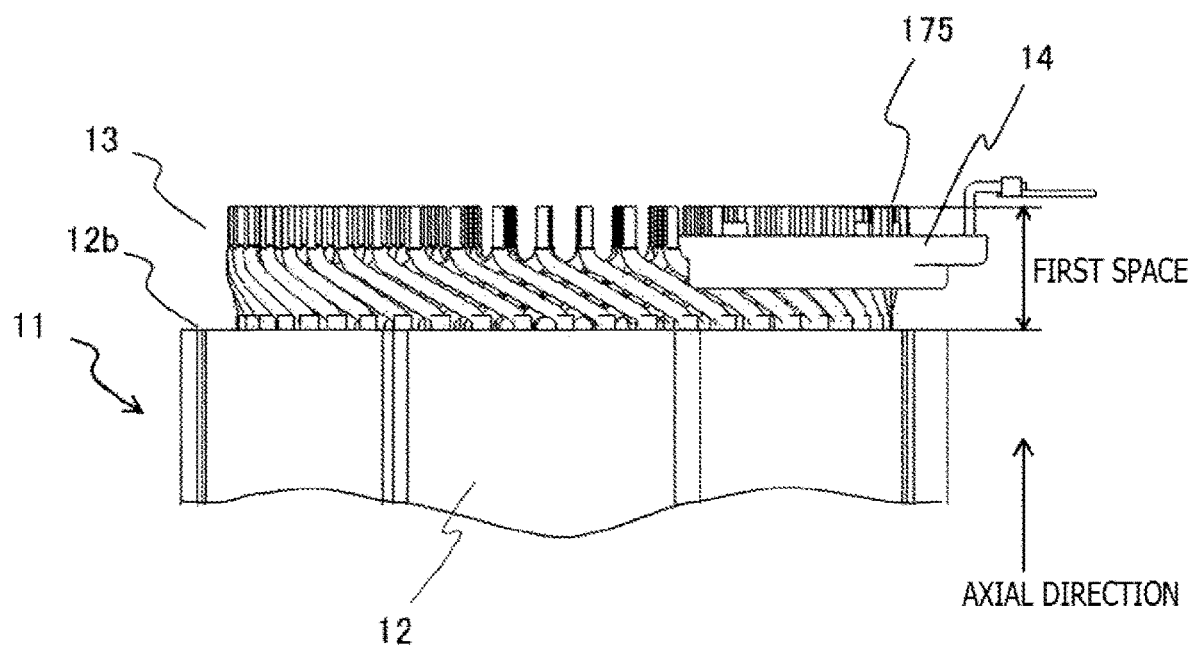
FIG. 16 is a side view showing a state in which the connection board is mounted to the stator in a first embodiment.

FIG. 16 is a side view showing a state in which the connection board 14 is mounted to the stator 11. The connection board 14 is mounted at a position in a first space between the segment coil end portion 175 (coil connection portion) and the stator core end portion 12b in the axial direction shown in FIG. 16, in a state in which the U-shaped segment coil end portions 175 are passed in the axial direction through through-holes 1411 (see FIG. 14) in the connection board 14. With the connection board 14 mounted at a position in the first space, the length of a coil final end portion of the stator winding 13 can be shortened, and the rotary electric machine 1 as the present embodiment can be reduced in size.

The connection board 14 is mounted to the stator winding 13. As a result, the U-shaped segment coil end portions 175 and end portions 1431 (see FIG. 14) of the group of connection conductors in the connection board 14 are located adjacent to each other. The U-shaped segment coil end portions 175 on an upper surface in regard of the axial direction of the connection board 14 and the end portions 1431 of the group of connection conductors of the connection board 14 are connected. At other portions than the upper surface in regard of the axial direction of the connection board 14, the U-shaped segment coil end portions 175 are mutually connected, whereby an electric circuit is formed.

As shown in FIG. 13, at other portions than the upper surface of the connection board 14, radially adjacent U-shaped segment coil end portions 175 of the inner U-shaped segment coils 17a mounted to the first layer and the second layer in the slots of the stator core 12 are mutually connected. Further, radially adjacent U-shaped segment coil end portions 175 of the inner U-shaped segment coils 17b mounted to the third layer and the fourth layer are mutually connected.

On the upper surface of the connection board 14, mutually adjacent portions of the end portions 1431 of the group of connection conductors in the connection board and the U-shaped segment coil end portions 175 are connected, whereas in regard of the U-shaped segment coil end portions 175 which are not adjacent to the end portions 1431 of the group of connection conductors, the radially adjacent U-shaped segment coil end portions 175 are mutually connected, whereby an electric circuit of the stator 11 is configured.

The method for connecting the U-shaped segment coil end portions 175 and the end portions 1431 of the group of connection conductors and for mutually connecting the U-shaped segment coil end portions 175 is TIG welding in the present embodiment, but other joining methods such as laser welding, electron beam welding, and ultrasonic welding can also be used.

First Embodiment

Figure 17:
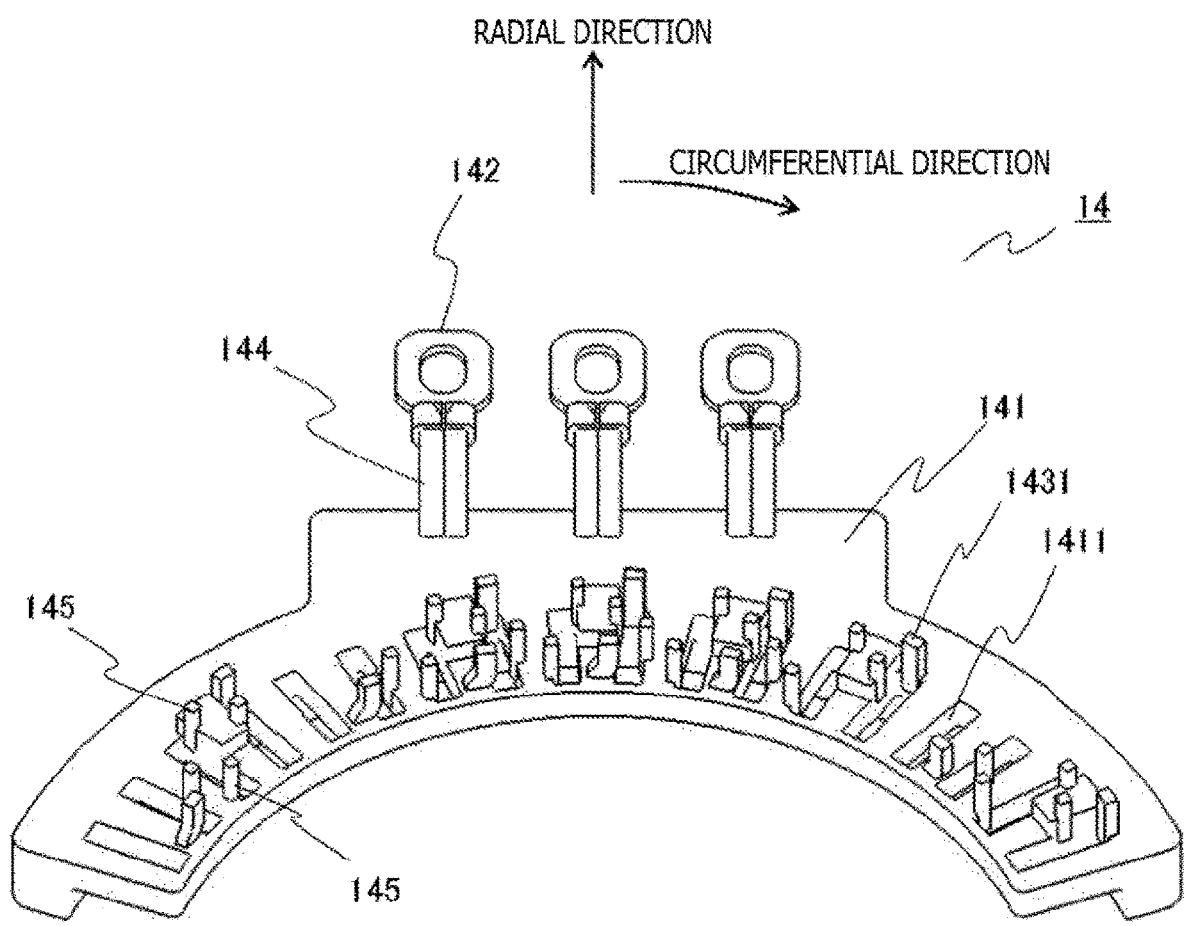
FIG. 17 is a perspective view of the connection board in the first embodiment.
Figure 18:
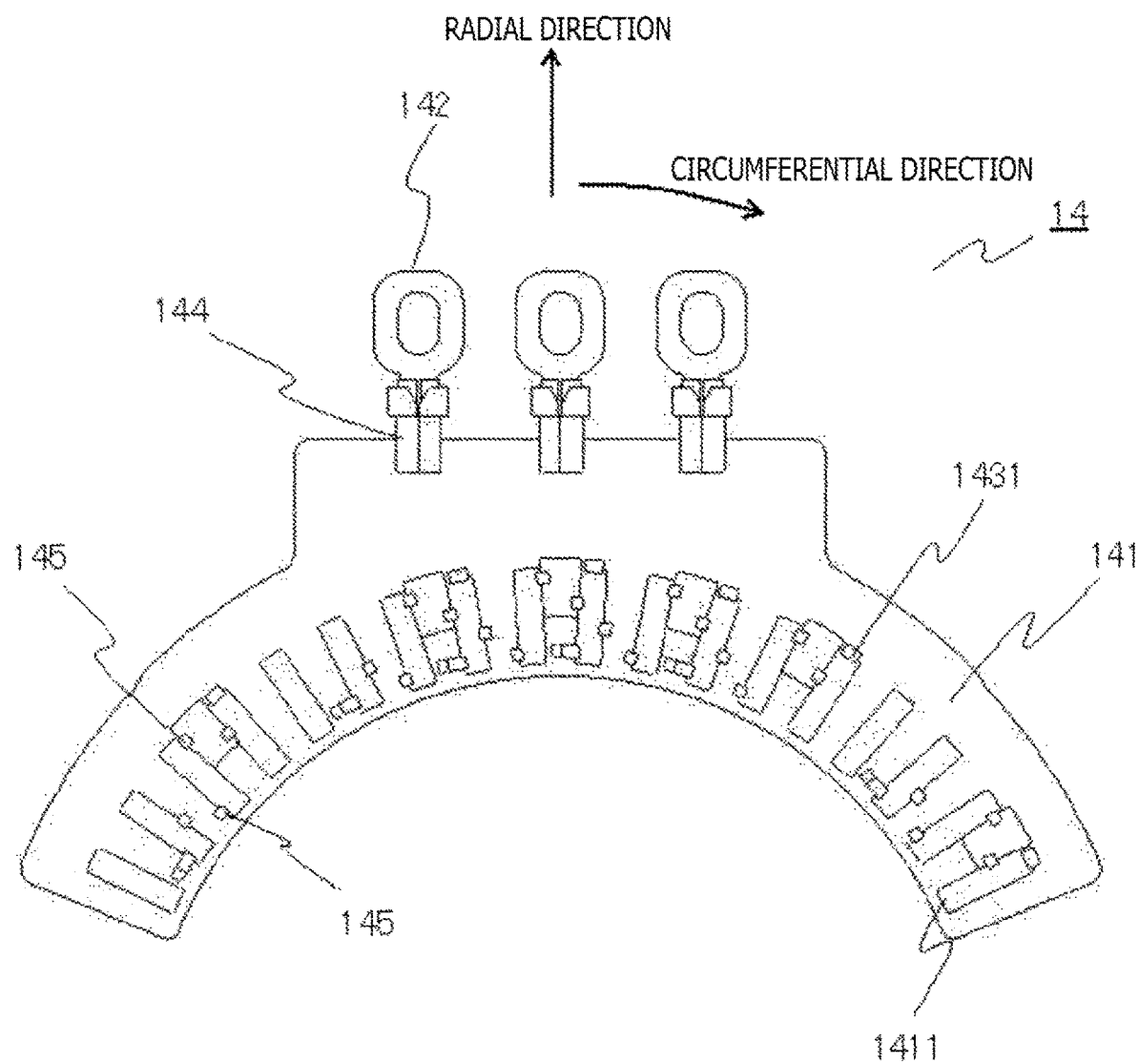
FIG. 18 is a front of the connection board in the first embodiment.
Figure 19:
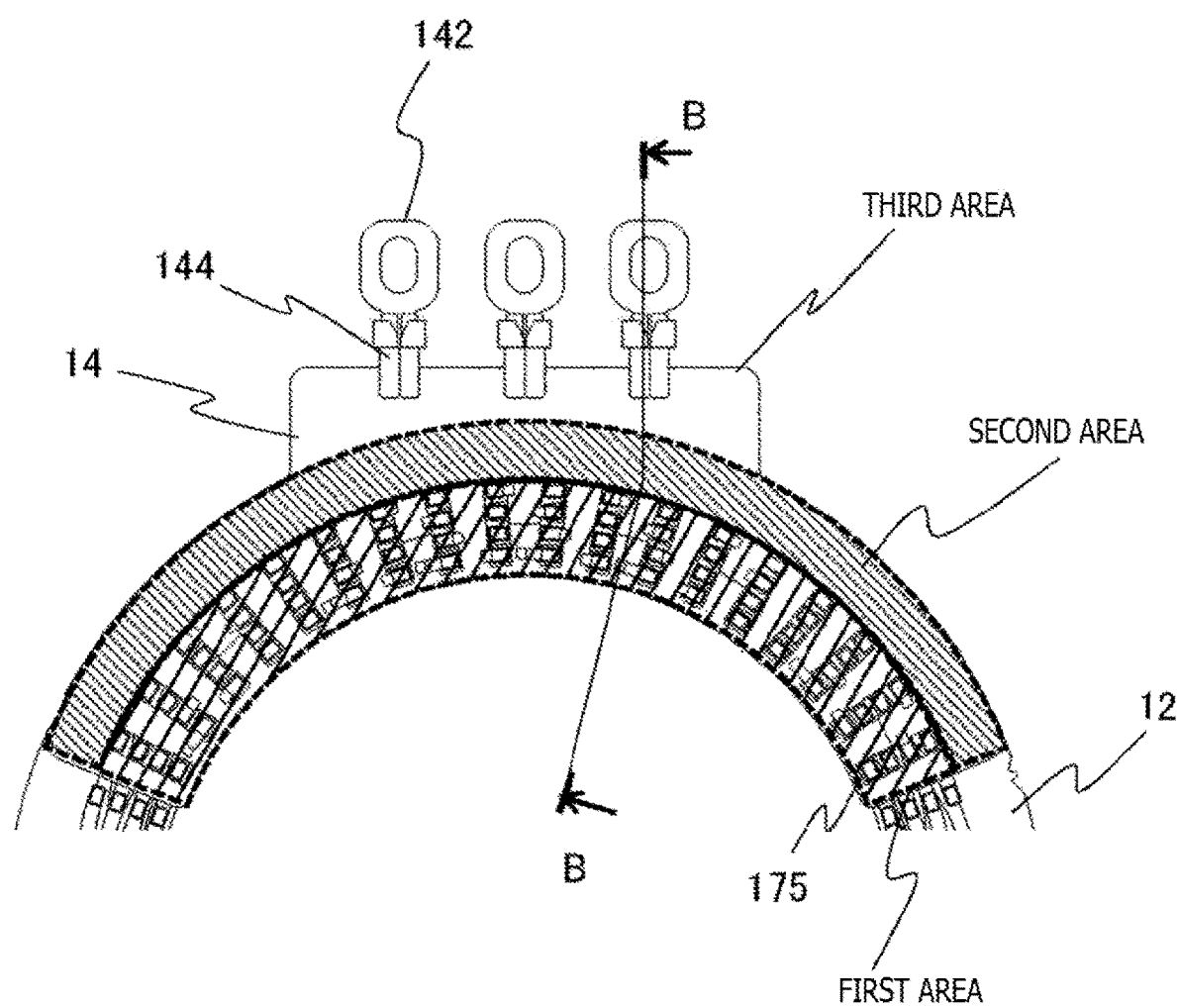
FIG. 19 is a front view showing a state in which an area of the connection board is divided in the first embodiment.
Figure 20:
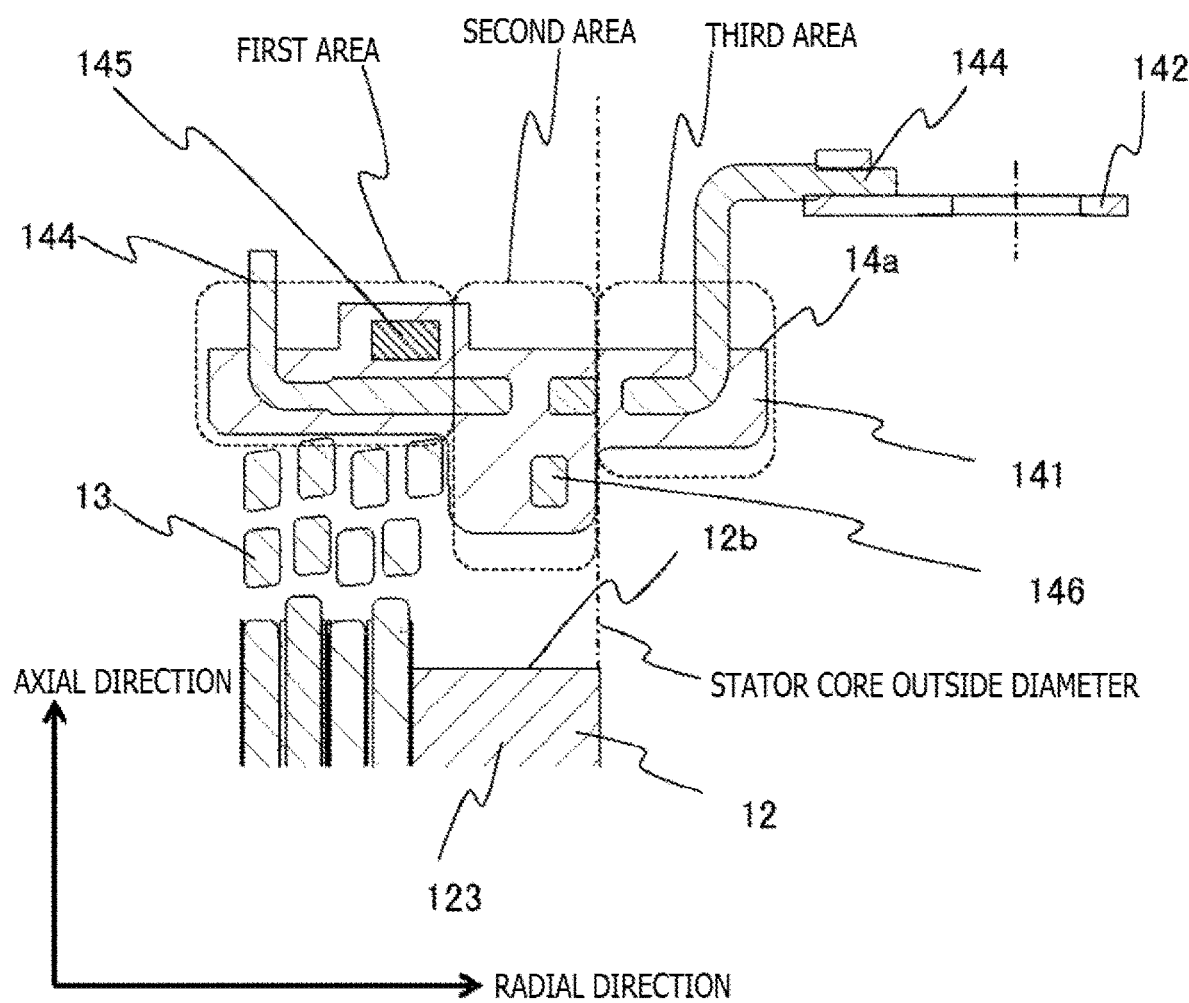
FIG. 20 is a sectional view taken alone line B-B of FIG. 19 in the first embodiment.
Figure 21:
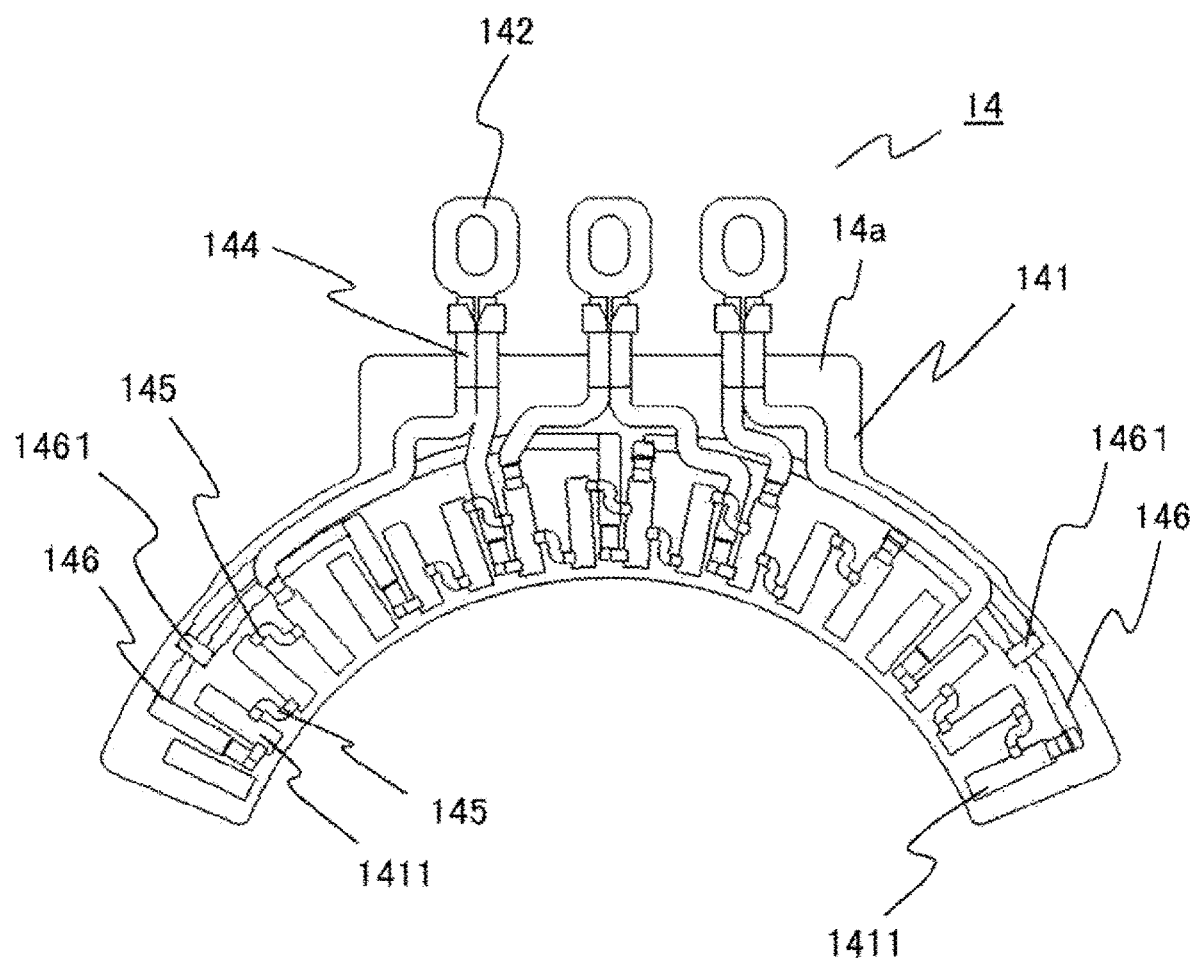
FIG. 21 is a layout view of connection conductors on a perspective basis through an insulating member of the connection board in the first embodiment.

A first embodiment will be described below, referring to FIGS. 17 to 21. FIG. 17 is a perspective view of a connection board 14. FIG. 18 is a front view of the connection board 14. FIG. 19 is a front view showing a state in which an area of the connection board 14 is divided. FIG. 20 is a sectional view taken along line B-B of FIG. 19. FIG. 21 is a layout view of connection conductors on a perspective basis through an insulating member of the connection board 14.

The connection board 14 is substantially fan-shaped as shown in FIGS. 17 and 18. As shown in FIGS. 19 and 20, the connection board 14 is divided along the radial direction into three areas on a functional basis.

A first area is a part overlapping with the stator core 12, as viewed in the axial direction from the U-shaped segment coil end portion 175 toward the end portion 12b of the stator core 12. The first area is an area where the U-shaped segment coil end portions 175 and the end portions 1431 of the group of connection conductors are connected, and where rectangular through-holes 1411 enabling the U-shaped segment coil end portions 175 to be mounted in the state of being aligned in the radial direction are provided (see FIGS. 17 and 18).

In the first area, the group of connection conductors is disposed in the insulating member 141 between two through-holes 1411 which are circumferentially adjacent to each other. The end portions 1431 of the group of connection conductors are adjacent in the circumferential direction and the radial direction of the through-holes 1411, and the end portions 1431 of the group of connection conductors are disposed protruding in the axial direction.

In the insulating member 141 between the circumferentially adjacent two through-holes 1411 in the first area, there are disposed input/output connection conductors 144, same-phase connection conductors 145 as connection conductors in the same phase, and different-phase connection conductors 146 for connection between different phases (see FIG. 21), and they are connected to the U-shaped segment coil end portions 175 protruded from the through-holes 1411 in the insulating member.

The same-phase connection conductor 145 is disposed between the through-hole 1411 and the through-hole 1411 which are adjacent in the circumferential direction, and makes connection between the first layer and the second layer and connection between the third layer and the fourth layer in the slot 112 in the stator core 12. As a result, the U-shaped segment coil end portion 175 and the U-shaped segment coil end portion 175 circumferentially adjacent thereto are connected.

The input/output connection conductor 144 and the different-phase connection conductor 146 are passed from a circumferentially adjacent portion of the through-hole 1411 corresponding to the first layer in the slot 122 in the stator core 12, are passed along the radial direction in the insulating member 141 circumferentially between the through-hole 1411 and the through-hole 1411, and are led out into a second area on the outside diameter side. In addition, the input/output connection conductor 144 and the different-phase connection conductor 146 are led out from a circumferentially adjacent portion on the outside diameter side of the through-hole 1411 into the second area on the outside diameter side. The input/output connection conductor 144 is disposed in a first space (see FIG. 16), in the first area and the second area located on the inner side of the outside diameter of the stator core 12.

The second area is a part overlapping with the stator core 12, as viewed in the axial direction from the U-shaped segment coil end portion 175 toward the end portion 12b of the stator core 12. It is an area on an upper side of a core back 123 of the stator core 12, and is located on the outside diameter side of the first area.

The different-phase connection conductor 146 connects the U-shaped segment coil end portions 175 of different phases while straddling a plurality of slots of the stator core 12, and the second area is an area to be a space for disposing the different-phase connection conductor 146 in the circumferential direction in this instance.

In addition, the second area is an area through which the input/output connection conductor 144 is passed into the third area, and in which the input/output connection conductor 144 is disposed while maintaining an electrical insulating distance from the different-phase connection conductor 146, without contacting the latter.

In the second area, the insulating member 141 extends in the axial direction toward the end portion 12b of the stator core 12, pluralities of the input/output connection conductors 144 and the different-phase connection conductors 146 are disposed in grade separation at such a distance that electrical insulation is maintained in the axial direction, and the input/output connection conductors 144 and the different-phase connection conductors 146 are covered with the insulating member 141.

In the present embodiment, the rotary electric machine 1 is configured by a Y-connection two-parallel electric circuit; therefore, as shown in FIG. 21, the different-phase connection conductors 146 configured from a U phase, a V phase and a W phase are connected at two positions, to form neutral points 1461. The neutral points 1461 are disposed in the insulating member 141, and they can be led out to the upper side of the insulating member 141 and jointed at the same timing as the joining of the group of connection terminals and the U-shaped segment coil end portions 175.

The third area is a part not overlapping with the stator core 12 as viewed in the axial direction from the U-shaped segment coil end portion 175 toward the end portion 12b of the stator core 12, and is disposed on the outer side than the outside diameter of the stator core 12. The third area is a base section 14a serving as a reference for being disposed at a predetermined position for connection with the cable 16 from the exterior. The base section 14a is provided at the connection board 14 located on the outer side of the outside diameter of the stator core 12, and supports part of the input/output connection conductors 144.

Of the input/output connection conductors 144 led out from the first area through the second area, those of the same phase are once disposed adjacently in the third area. The input/output connection conductors 144 are led out from the inside of the insulating member 141 to the exterior, and are laid at predetermined positions for connection with the cable 16 (see FIG. 1) from the exterior.

As shown in FIG. 21, the input/output connection conductors 144 led out from the first area are passed from the first area through the second area such as to be a U phase, a V phase and a W phase from the left side in the figure and are disposed in the third area such that those of the same phase are adjacent. As shown in FIG. 20, the input/output connection conductor 144 led out in such a direction as to be spaced away in the axial direction from the stator core 12 on the outer side than the inside of the insulating member 141, is then bent, and is led out to the outside diameter side in the radial direction. An input/output connection terminal 142 is connected to an end portion of the input/output connection conductor 144.

In the third area, the input/output connection conductors 144 of the same phase are collected together, and each phase is disposed at a predetermined position. The connection board 14 is restricted in the axial direction and the radial direction, as a reference base for the position of connection of the cable 16 with the exterior, in such a manner as not to be damaged or broken due, for example, to vibrations on the vehicle side.

In addition, the connection board 14 and the stator winding 13 are mutually restricted by connection at a coil connection section 18 (see FIG. 13), and reliability is enhanced by fixing the base section 14a in the third area to the center housing 2 as shown in FIG. 1. In the present embodiment, the position of connection with the cable 16 is located in such a direction as to be spaced away from the end portion 12b of the stator core in the axial direction and in such a direction as to be spaced away from the center in the radial direction, as compared to the coil connection section 18 between the stator winding 13 and the connection board 14 at an upper portion in the axial direction; since the cable position differs from vehicle to vehicle, however, the position of connection with the cable 16 can be disposed at various positions depending on the way in which the input/output connection terminal 142 is led out starting from the base section 14a in the third area.

A method for manufacturing the connection board 14 is insert resin molding in which the connection board 14 is formed by resin molding together with the group of connection conductors. The material for the insulating member 141 is desirably PPS resin, PEEK resin, epoxy resin or the like which is high in thermal resistance; in the present embodiment, the insulating member 141 is desirably formed from PPS resin.

In addition, the wiring of the group of connection conductors is an example of a stator 11 of an 8-pole, 3-phase, 48-slot rotary electric machine 1 with four conductors in each slot, which may vary depending on the specifications of the rotary electric machine and/or layout of conductor wires of each phase in the slot.

While the number of conductors in the stator core is explained to be four in the present embodiment, a similar effect can be obtained even when the number of conductors in the slot varies to six, eight, ten or the like.

As has been described above, according to the present embodiment, the height of the coil end portion of the stator winding and the number of kinds of the stator winding can be minimized, and it is possible to provide a rotary electric machine which is high in productivity, small in size and high in output.

Second Embodiment

Figure 22:
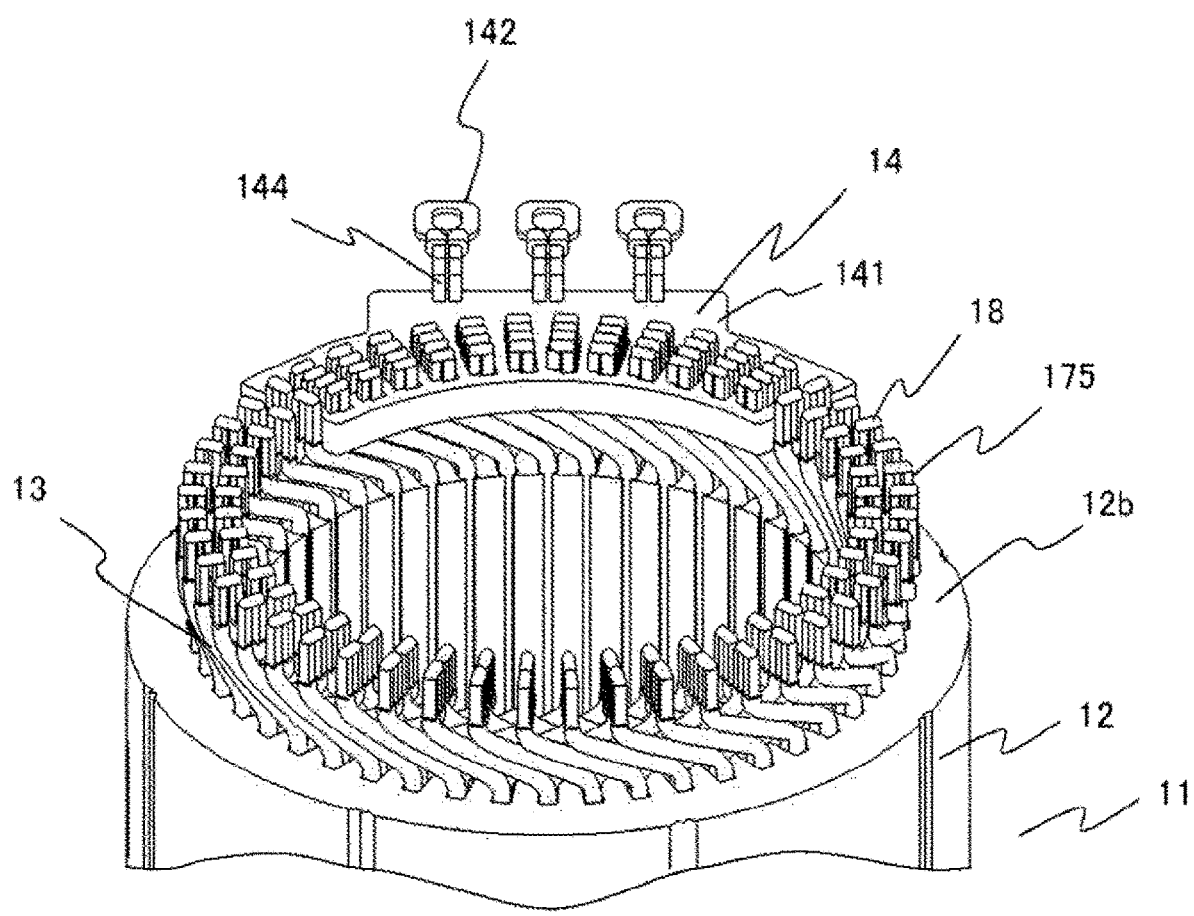
FIG. 22 is a perspective view, as viewed from the connection board side, of a stator in a second embodiment.
Figure 23:
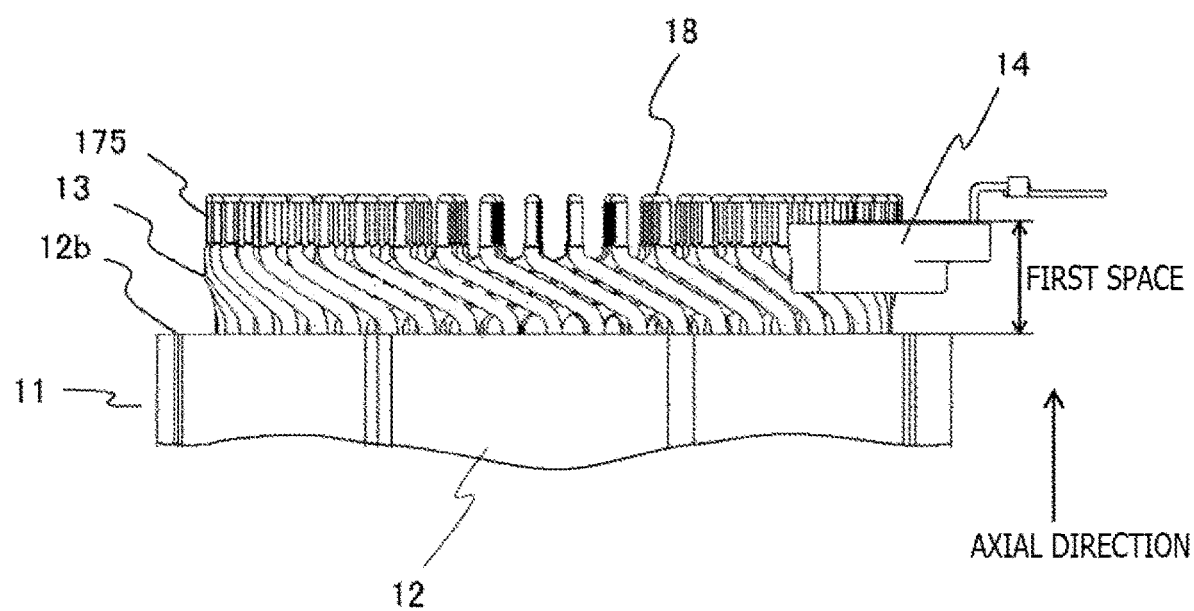
FIG. 23 is a side view of the stator in the second embodiment.
Figure 24:
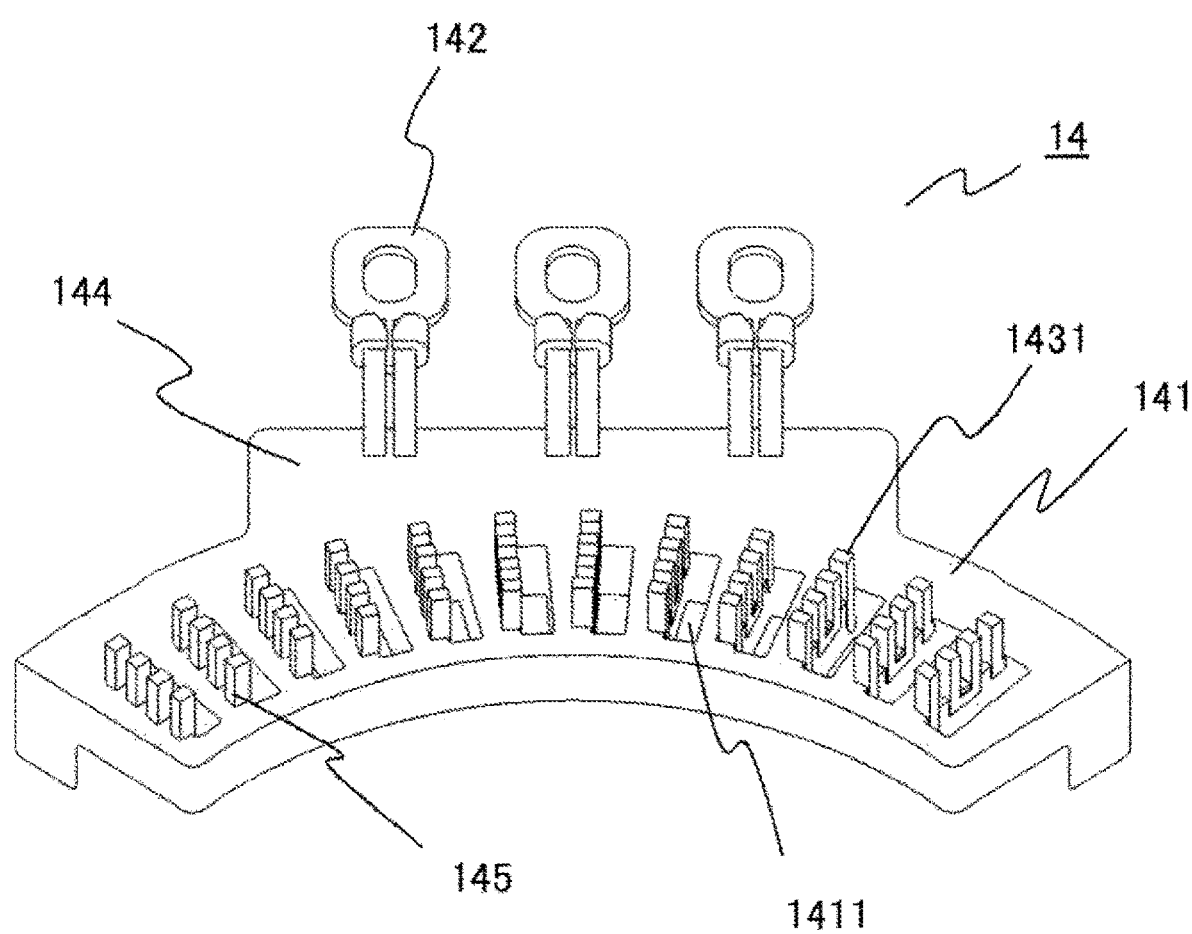
FIG. 24 is a perspective view of a connection board in the second embodiment.
Figure 25:
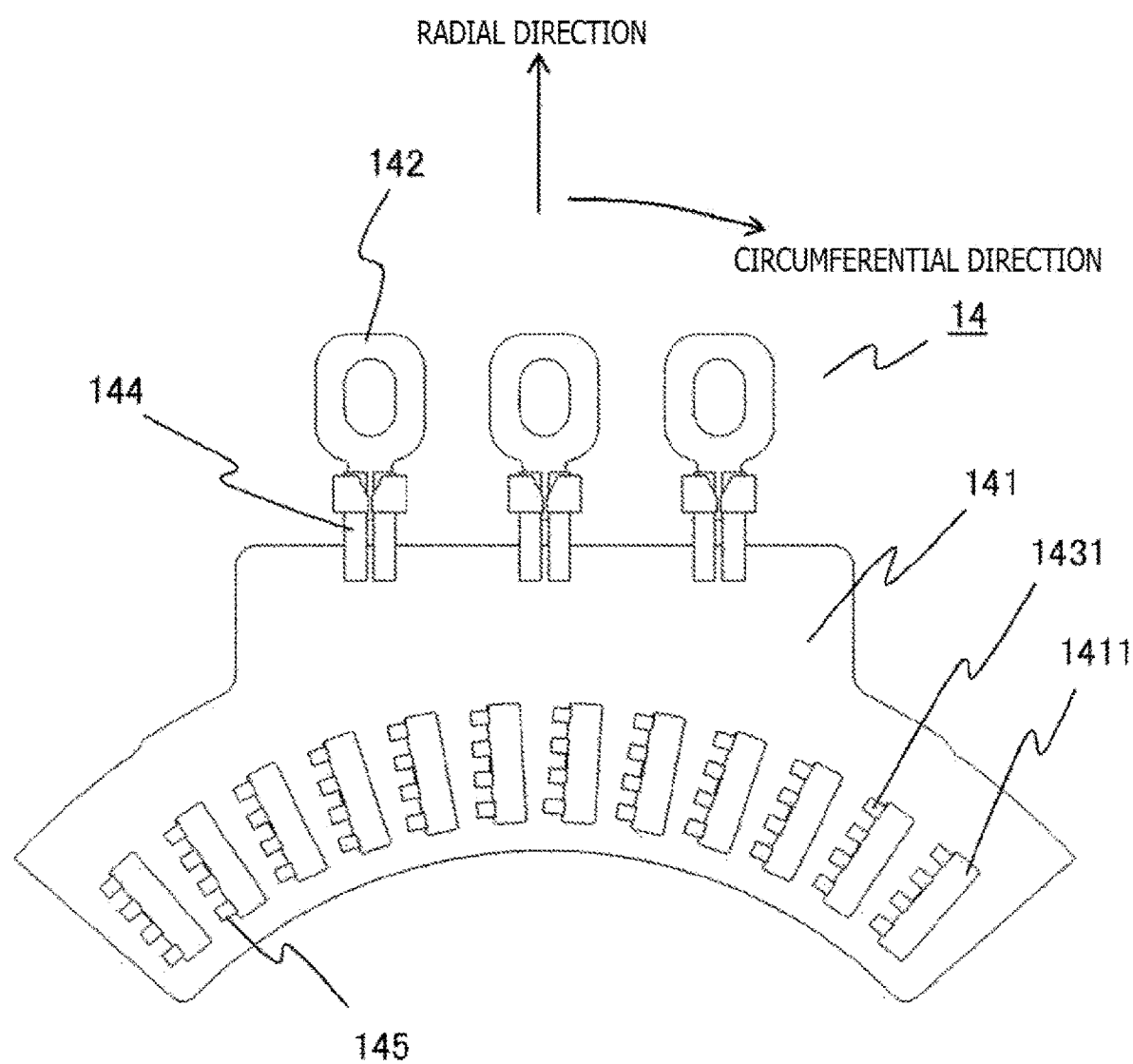
FIG. 25 is a front view of the connection board in the second embodiment.
Figure 26:
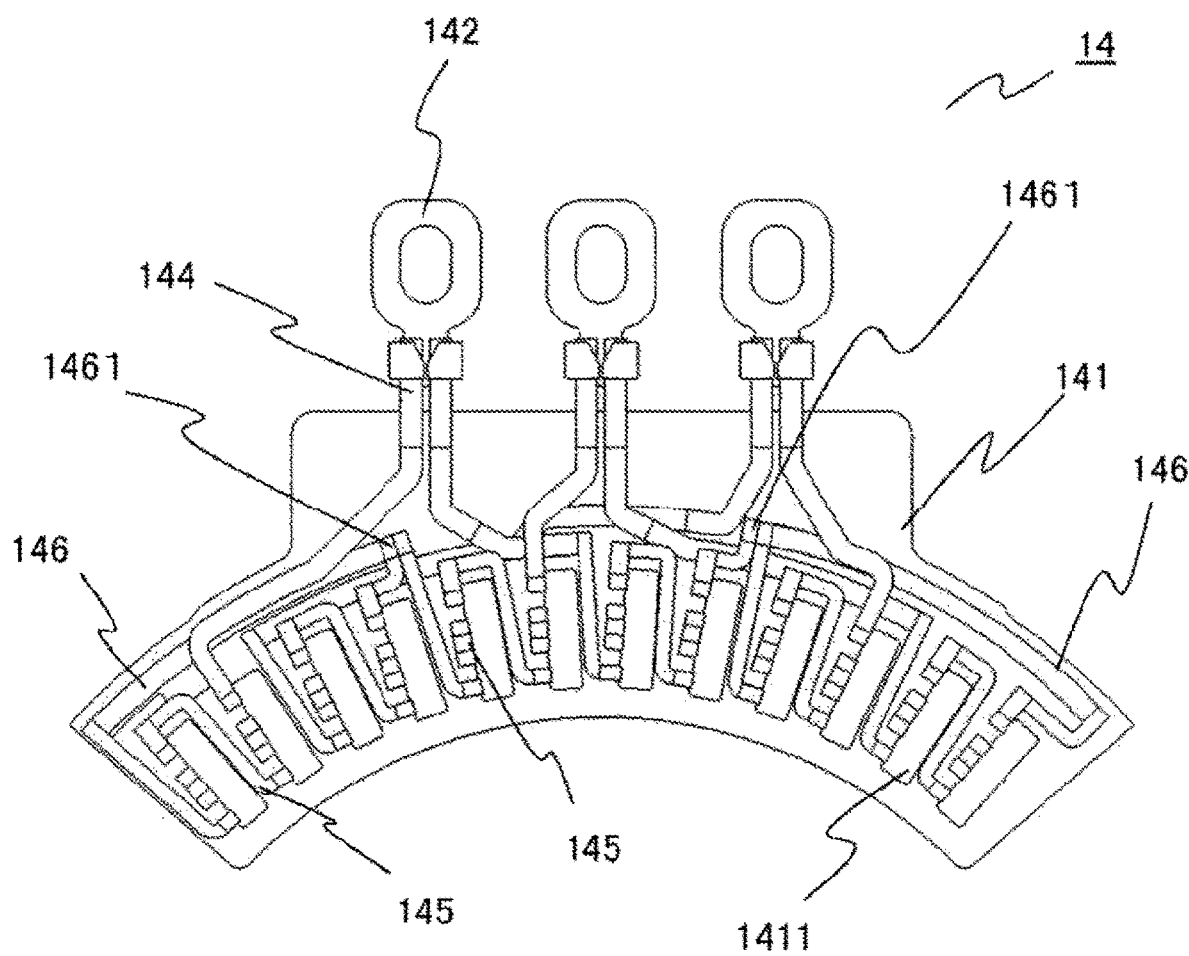
FIG. 26 is a layout view of connection conductors on a perspective basis through an insulating member of the connection board in the second embodiment.
Figure 27:
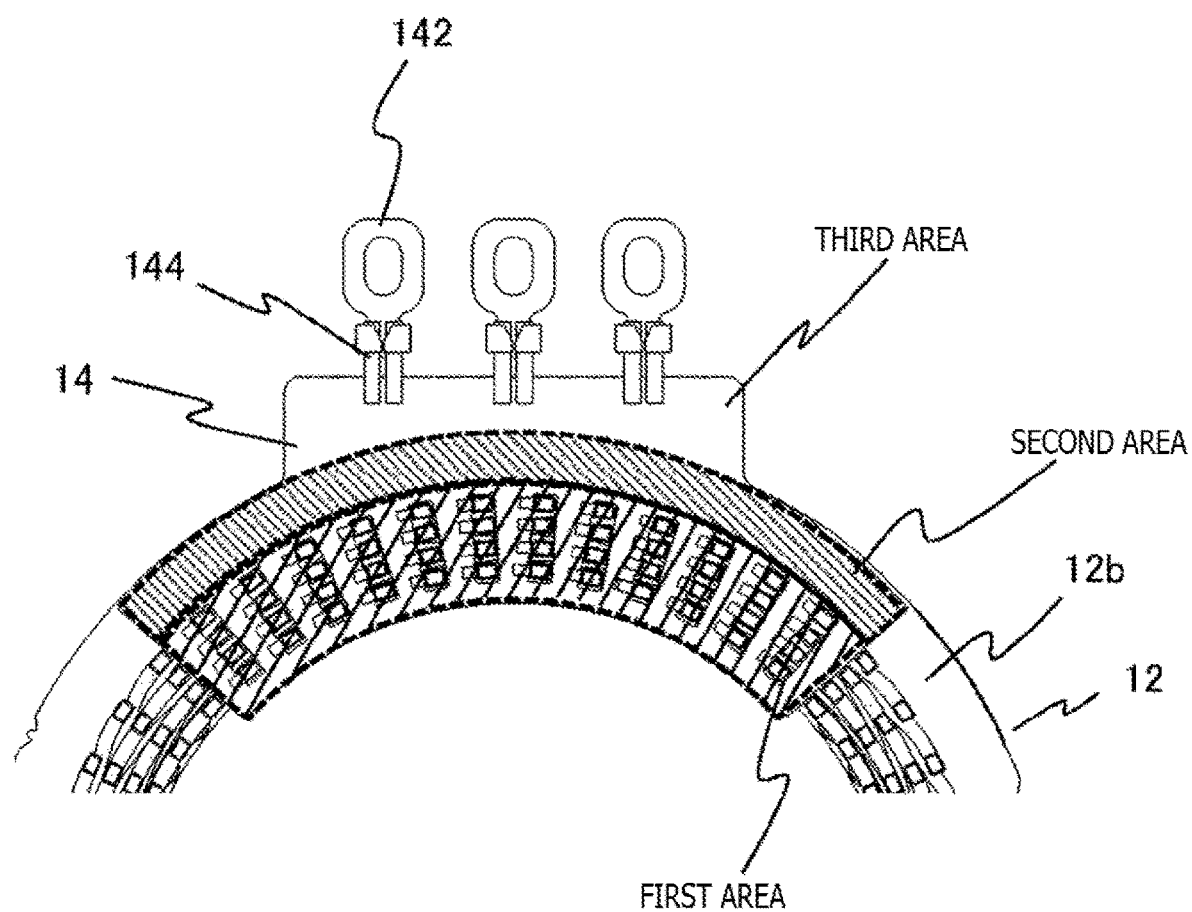
FIG. 27 is a front view showing a state in which an area of the connection board is divided in the second embodiment.

A second embodiment will be described below, referring to FIGS. 22 to 27. FIG. 22 is a perspective view of a stator 11 as viewed from a connection board 14 side. FIG. 23 is a side view of the stator 11. FIG. 24 is a perspective view of the connection board 14. FIG. 25 is a front view of the connection board 14. FIG. 26 is a layout view of connection conductors on a perspective basis through an insulating member of the connection board 14. FIG. 27 is a front view showing an area of the connection board 14 is divided.

In the first embodiment, in regard of connection between the connection board 14 and the stator winding 13, the direction in which the end portions 1431 of the group of connection conductors and the U-shaped segment coil end portions 175 are adjacent to each other exist in both the circumferential direction and the radial direction, so that connections in two directions are generated in the case of producing the stator 11, and the connecting operation may be complicated. In view of this, in the second embodiment, for improving productivity, the end portions 1431 of the group of connection conductors and the U-shaped segment coil end portions 175 are connected in the same direction.

The second embodiment is the same as the first embodiment in the configuration ranging from mounting of the U-shaped segment coils 17 shown in FIG. 11 to the stator core 12 to twisting of the U-shaped segment coil end portions 175, but is different from the first embodiment in the configuration of the group of connection conductors of the connection board 14.

In the second embodiment, the connection board 14 having the group of connection conductors covered by the insulating member 141 and fixed is mounted on the U-shaped segment coil end portion 175 side of the stator winding 13, as shown in FIGS. 22 to 24, for the purpose of configuring an electric circuit of the stator 11. Besides, the connection board 14 connects the U-shaped segment coil end portions 175 and the end portions 1431 of the group of connection conductors and mutually connects the U-shaped segment coil end portions 175.

As shown in FIG. 26, a connection terminal group 143 of the connection board 14 is configured by a group of connection conductors composed of a plurality of connection conductors, namely, the input/output connection conductors 144 for connection between the exterior of the rotary electric machine 1 and the stator 11, same-phase connection conductors 145 for connection in the same phase, and different-phase connection conductors 146 (in the present embodiment, corresponding to neutral points of Y-connection) for connection between different phases. The group of connection conductors is fixed inside the insulating member 141 while maintaining a predetermined interval for electrical insulation.

As shown in FIGS. 22 and 24, the U-shaped segment coil end portions 175 of the stator winding 13 are passed in the axial direction through the through-holes 1411 in the connection board 14, and the connection board 14 is mounted at a position in a first space between the segment coil end portions 175 (coil connection section 18) and the stator core end portion 12b in the axial direction shown in FIG. 23. With the connection board 14 mounted at a position in the first space, the coil end of the stator winding 13 can be suppressed to a low level, which can contribute to a reduction in the size of the rotary electric machine as the present embodiment.

With the connection board 14 mounted to the stator winding 13, the U-shaped segment coil end portions 175 and the end portions 1431 of the group of connection conductors in the connection board 14 are disposed adjacently in the circumferential direction.

In the present embodiment, as shown in FIG. 22, with respect to connection at other parts than the upper surface of the connection board 14, the U-shaped segment coil end portions 175 adjacent in the radial direction of the inner U-shaped segment coils 17a mounted to the first layer and the second layer in the slots in the stator core 12 are mutually connected. Further, the U-shaped segment coil end portions 175 adjacent in the radial direction of the inner U-shaped segment coils 17b mounted to the third layer and the fourth layer in the slots in the stator core 12 are mutually connected.

On the upper surface of the connection board 14, as shown in FIG. 24, the end portions 1431 of the group of connection conductors in the connection board 14 are disposed adjacent in the circumferential direction to the rectangular through-holes 1411 provided in the insulating member 141, and are led out in the axial direction. The end portions 1431 of the group of connection conductors and the U-shaped segment coil end portions 175 are adjacent to each other in the circumferential direction, and with the end portions mutually connected, an electric circuit as the stator 11 is configured.

A method for connecting the U-shaped segment coil end portions 175 and the end portions 1431 of the group of connection conductors and for mutually connecting the U-shaped segment coil end portions 175 is TIG welding in the present embodiment, but other joining methods such as laser welding, electron beam welding, and ultrasonic welding can also be used.

The structure of the connection board 14 in the present embodiment will be described below, referring to FIGS. 24 to 27. As shown in FIGS. 24 to 26, the insulating member 141 of the connection board 14 is substantially fan-shaped, and, as shown in FIG. 27, it is divided into three areas on a functional basis, as viewed in the axial direction from the U-shaped segment coil end portions 175 toward the end portion 12b of the stator core 12.

As shown in FIG. 27, a first area is a part overlapping with the stator core 12, as viewed in the axial direction from the U-shaped segment coil end portions 175 toward the end portion 12b of the stator core 12, and corresponds to the position on the upper surface in regard of the axial direction of inside diameter side teeth 121 on the upper surface of the stator core 12.

The first area is an area where the U-shaped segment coil end portions 175 and the end portions 1431 of the group of connection conductors are connected, and where rectangular through-holes 1411 enabling the U-shaped segment coil end portions 175 to be mounted in the state of being aligned in the radial direction are provided.

As shown in FIGS. 24 to 26, in the first area, the group of connection conductors are disposed in the insulating member 141 between the through-hole 1411 and the circumferentially adjacent through-hole 1411, and the end portions 1431 of the group of connection conductors are circumferentially adjacent to the rectangular through-holes 1411 and are disposed protruding in the axial direction.

In the insulating member 141 between the through-hole 1411 and the circumferentially adjacent through-hole 1411 in the first area, there are disposed input/output connection conductors 144, same-phase connection conductors 145 as connection conductors in the same phase, and different-phase connection conductors 146 for connection between different phases, and they are connected to the U-shaped segment coil end portions 175 protruded from the through-holes 1411.

In the case of the present embodiment, the same-phase connection conductors 145 are disposed circumferentially between the through-hole 1411 and the through-hole 1411, and the same-phase connection conductors 145 for connection of the first layer and the fourth layer in the slot in the stator core 12 are disposed. In addition, the same-phase connection conductors 145 for connection of the second layer and the third layer in the slots in the stator core 12 are disposed, and the U-shaped segment coil end portion 175 and the circumferentially adjacent U-shaped segment coil end portion 175 are connected by the same-phase connection conductor 145.

The input/output connection conductor 144 and the different-phase connection conductor 146 are passed from a circumferentially adjacent portion of the rectangular through-hole 1411 corresponding to the first layer in the slot in the stator core 12, along the radial direction inside the insulating member located circumferentially between the through-hole 1411 and the through-hole 1411, and is led out into the second area on the outside diameter side. In addition, the input/output connection conductor 144 and the different-phase connection conductor 146 are led out from a circumferentially adjacent portion on the outside diameter side of the through-hole 1411 into the second area on the outside diameter side.

The second area is a part overlapping with the stator core 12, as viewed in the axial direction from the U-shaped segment coil end portions 175 toward the end portion 12b of the stator core 12. It is an area on the upper surface of a core back 123 of the stator core 12, and is located on the outside diameter side of the first area.

The different-phase connection conductor 146 connects the U-shaped segment coil end portions 175 of different phases while straddling a plurality of slots of the stator core 12. In this case, the second area is an area serving as a space for wiring the different-phase connection conductors 146 in the circumferential direction. In addition, the second area is an area for passing the input/output connection conductor 144 therethrough into the third area, and is disposed while maintaining an electrical insulating distance such as not to contact the different-phase connection conductor 146.

Since pluralities of the input/output connection conductors 144 and the different-phase connection conductors 146 are disposed in the second area, grade separation can be achieved with such a distance that electrical insulation is maintained in the axial direction, the insulating member 141 is long in the axial direction toward the end portion 12b of the stator core 12, and the input/output connection conductors 144 and the different-phase connection conductors 146 are covered with the insulating member 141.

In the present embodiment, the rotary electric machine 1 is configured by a Y-connection two-parallel electric circuit, so that the different-phase connection conductors 146 correspond to neutral points 1461. The different-phase connection conductors 146, configured from a U phase, a V phase and a W phase, are connected at two positions, to form the neutral points 1461. Note that while the neutral points 1461 are disposed in the insulating member 141 in the present embodiment, they can be led out in the axial direction onto the upper surface of the insulating member 141 and be joined at the same timing with the joining of the group of connection terminals and the U-shaped segment coil end portions 175.

The third area is a part not overlapping with the stator core 12, as viewed in the axial direction from the U-shaped segment coil end portions 175 toward the end portion 12b of the stator core 12, and is disposed on the outer side than the outside diameter of the stator core 12. The third area is a base section 14a serving as a reference for disposition at a predetermined position for connection with the cable 16 from the exterior.

Of the input/output connection conductors 144 led out from the first area through the second area, those of the same phase are once disposed adjacently and aligned in the third area. The input/output connection conductors 144 are led out from the inside of the insulating member 141 to the exterior, and are wired at predetermined positions for connection with the cable 16 from the exterior.

In the present embodiment, as shown in FIG. 26, the input/output connection conductors 144 led out from the first area are passed from the first area through the second area such as to be a U phase, a V phase and a W phase from the left side in the figure, and are disposed in the third area such that those of the same phase are adjacent. The input/output connection conductor 144 is led out in such a direction as to be spaced away in the axial direction from the stator core 12 located on the outer side than the insulating member 141, is then bent, and is led out to the outside diameter side in the radial direction, and the input/output connection terminal 142 is connected to an end portion of the input/output connection conductor 144.

The third area is an area where the input/output connection conductors 144 of the same phase are collected together and each phase is disposed at a predetermined position. Besides, the connection board 14 is a part which becomes a reference base for the position of connection of the cable 16 with the exterior and at which restriction in the axial direction and the radial direction is made such as not to be damaged or broken due, for example, to vibrations on the vehicle side. In addition, since the connection board 14 and the stator winding 13 are connected at the coil connection section 18, reliability of disposition is enhanced by fixing the base section 14a in the third area to the center housing 2 as shown in FIG. 1.

In the present embodiment, the position of connection with the cable 16 is located in such a direction as to be spaced away from the end portion 12b of the stator core in the axial direction and in such a direction as to be spaced away from the center in the radial direction, as compared to the position of connection between the stator winding 13 and the connection board 14 at an upper portion in the axial direction; since the cable position differs from vehicle to vehicle, however, the connection position can be disposed at various positions depending on the way in which the input/output connection terminal is led out starting from the base section 14a in the third area.

As has been described above, in the second embodiment, the end portions 1431 of the group of connection conductors of the connection board 14 are led out in the axial direction adjacently to a surface along the radial direction of the rectangular through-hole 1411, and the connection between the U-shaped segment coil end portions 175 on the connection board 14 and the end portions 1431 of the group of connection conductors can be made unifiedly in the circumferential direction, and, thus, the structure is excellent in productivity.

While the present embodiment has been described taking as an example a case where the number of the conductors in the stator core 12 is four, a similar effect can be obtained even when the number of conductors in the slot is changed to six, eight, ten or the like. For example, in the case where the number of conductors in the slot is six, the input/output connection conductor 144 of the connection board 14 and the different-phase connection conductor 146 are connected to the U-shaped segment coil end portions 175 of the first layer and the sixth layer (outermost layer) in the slot in the stator core 12, and are led out to the second area. The same-phase connection conductor 145 constitutes a connection conductor for mutually connecting the circumferentially adjacent U-shaped segment coil end portions 175 of the first layer and the sixth layer (outermost layer) in the slot in the stator core 12. As a result, the connection conductors for mutually connecting the U-shaped segment coil end portions 175 of the second layer and the third layer, and those of the fourth layer and the fifth layer, in the slot in the stator core 12 are configured and are connected, whereby an electric circuit is configured, to form the stator 11.

As has been described above, even if the number of conductors in the slot is changed to six, the connection board 14 can be configured with a minimum number of connection conductors in the same kind as that when the number of conductors in the slot is four, without increasing the number of kinds of the connection conductors of the connection board 14, and the same applies also when the number of conductors in the slot is changed to eight, ten or the like.

In the present embodiment, the wiring of the group of connection conductors is an example of a stator 11 of an 8-pole, 3-phase, 48-slot rotary electric machine 1 with four conductors in each slot, which may vary depending on the specifications of the rotary electric machine and/or layout of conductor wires of each phase in the slot.

According to the present embodiment, the height of the coil end portion of the stator winding and the number of kinds of the stator winding can be minimized, and it is possible to provide a rotary electric machine which is high in productivity, small in size and high in output.

Third Embodiment

Figure 28:
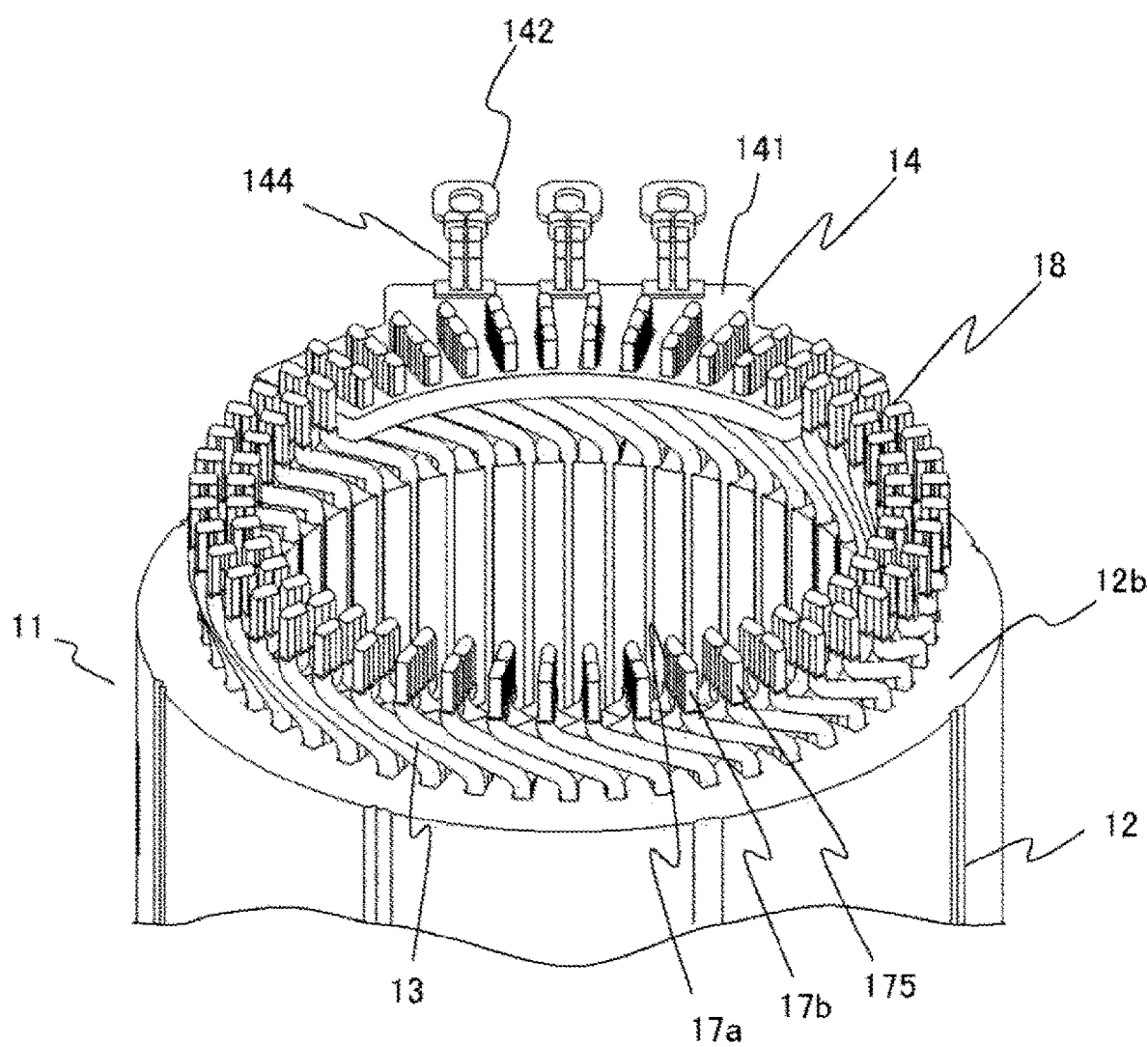
FIG. 28 is a perspective view, as viewed from a connection board side, of a stator in a third embodiment.
Figure 29:
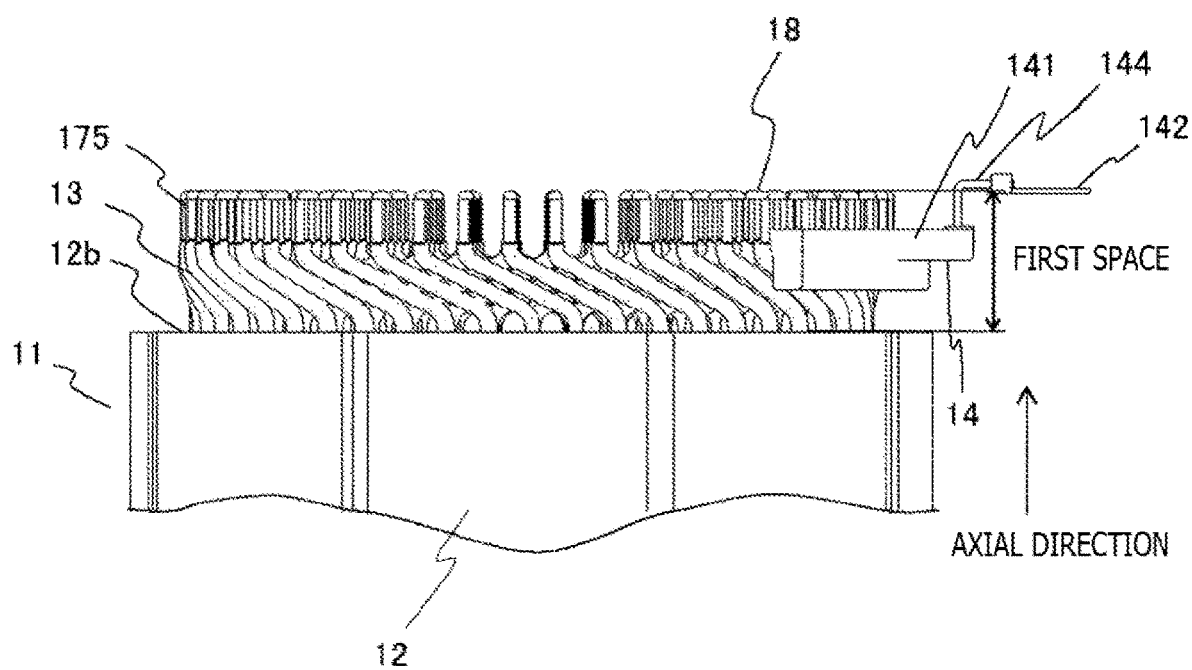
FIG. 29 is a side view of the stator in the third embodiment.
Figure 30:
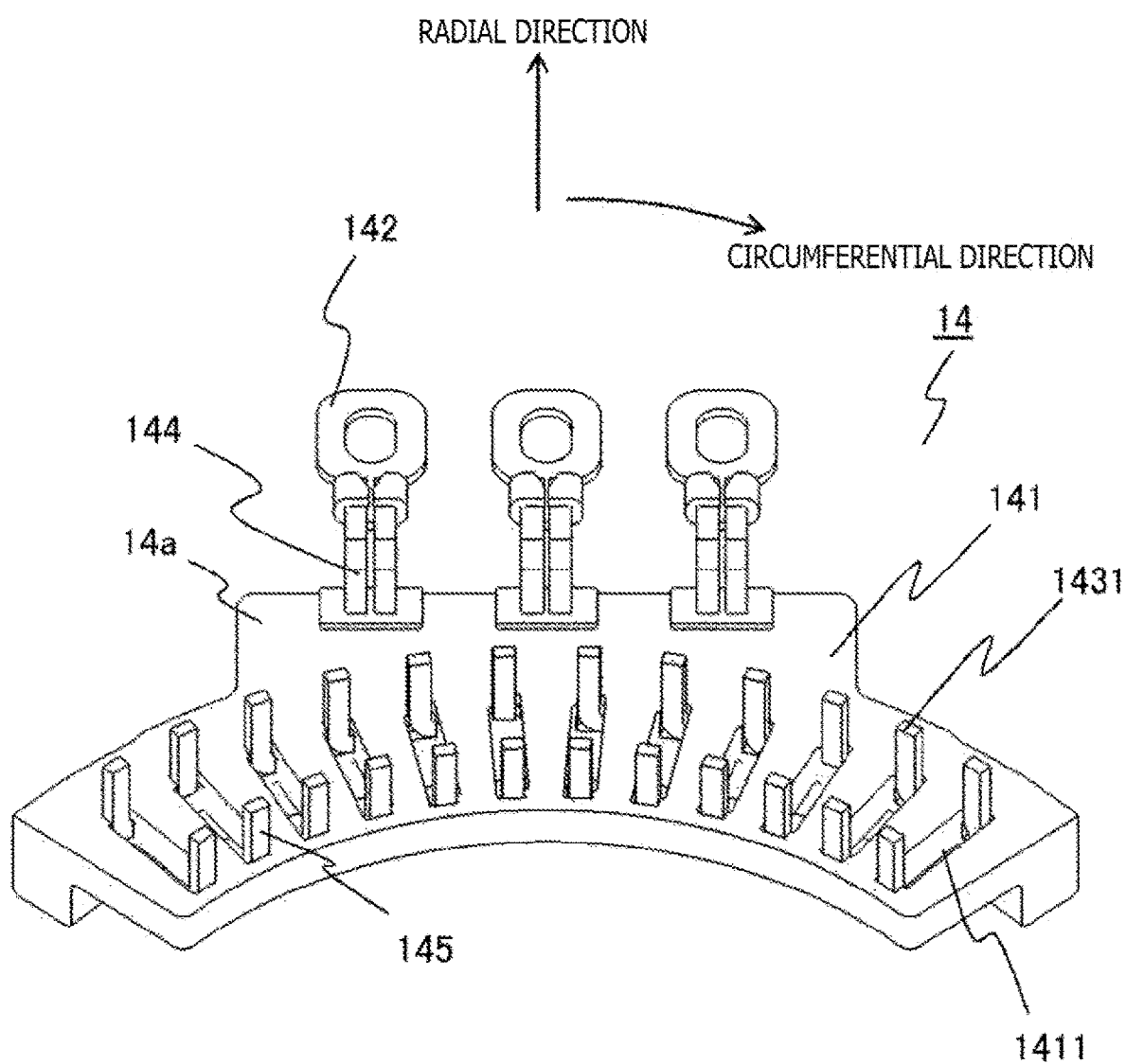
FIG. 30 is a perspective view of a connection board in the third embodiment.
Figure 31:
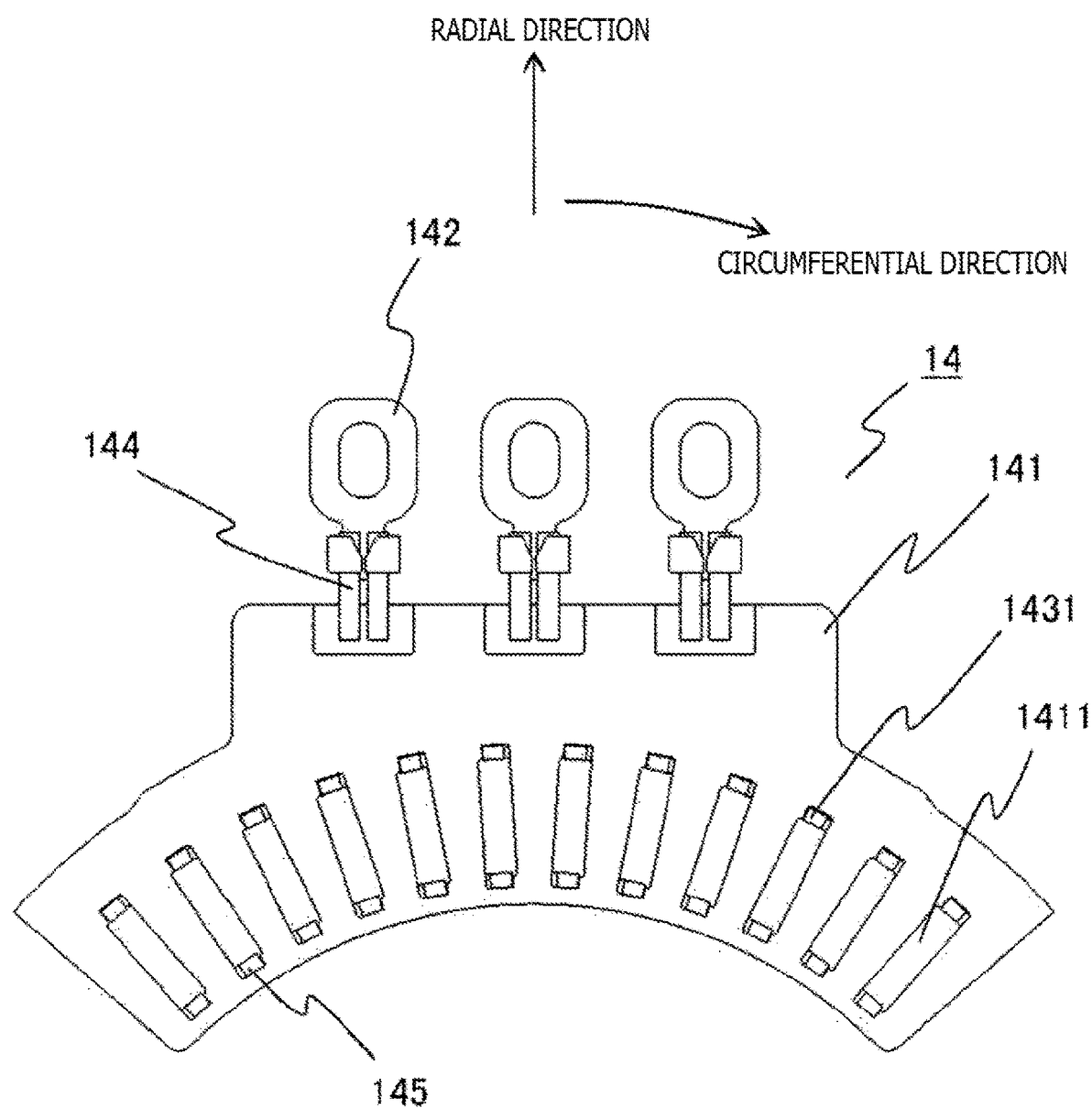
FIG. 31 is a front of the connection board in the third embodiment.
Figure 32:
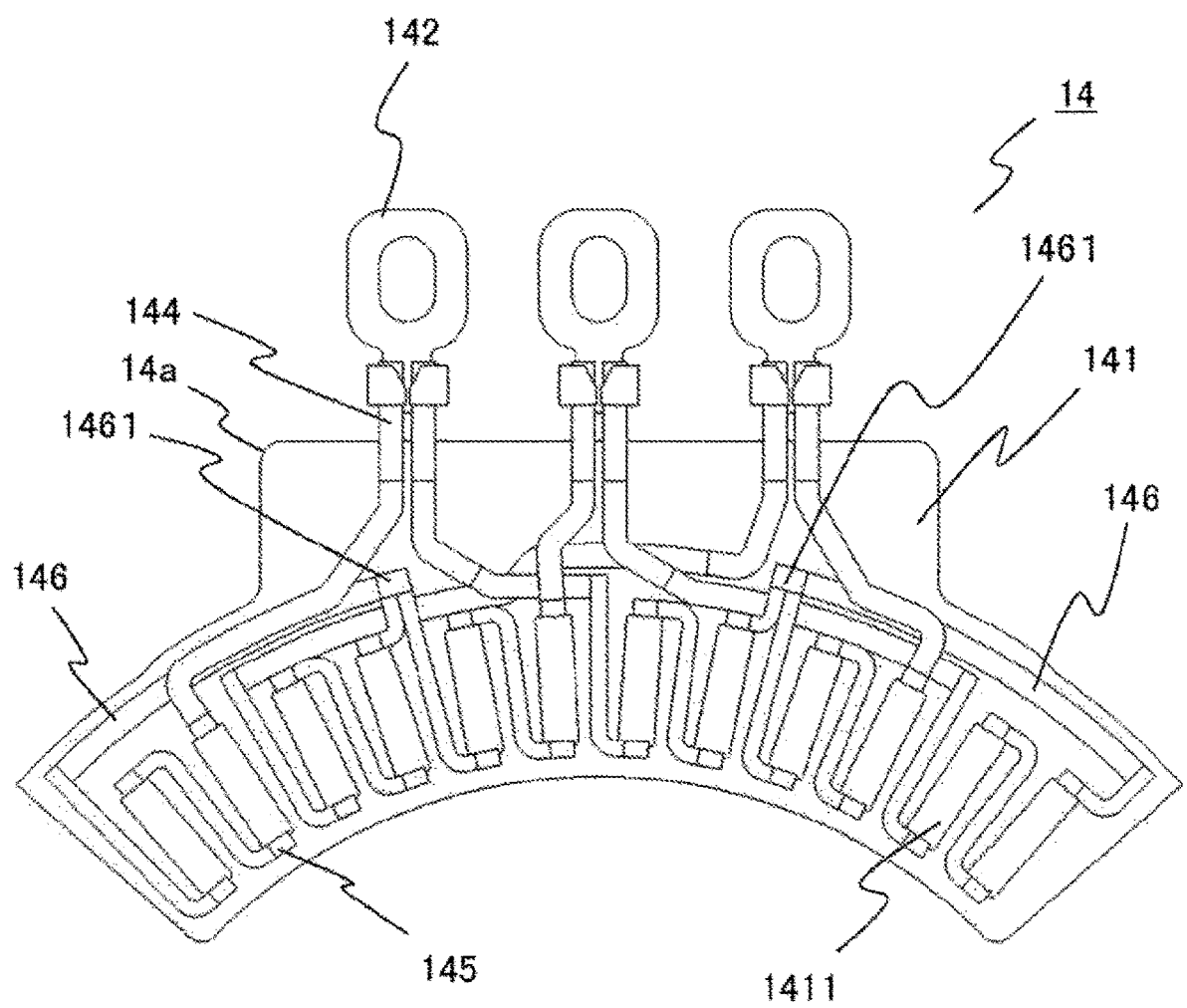
FIG. 32 is a layout view of connection conductors on a perspective basis through an insulating member of the connection board in the third embodiment.
Figure 33:
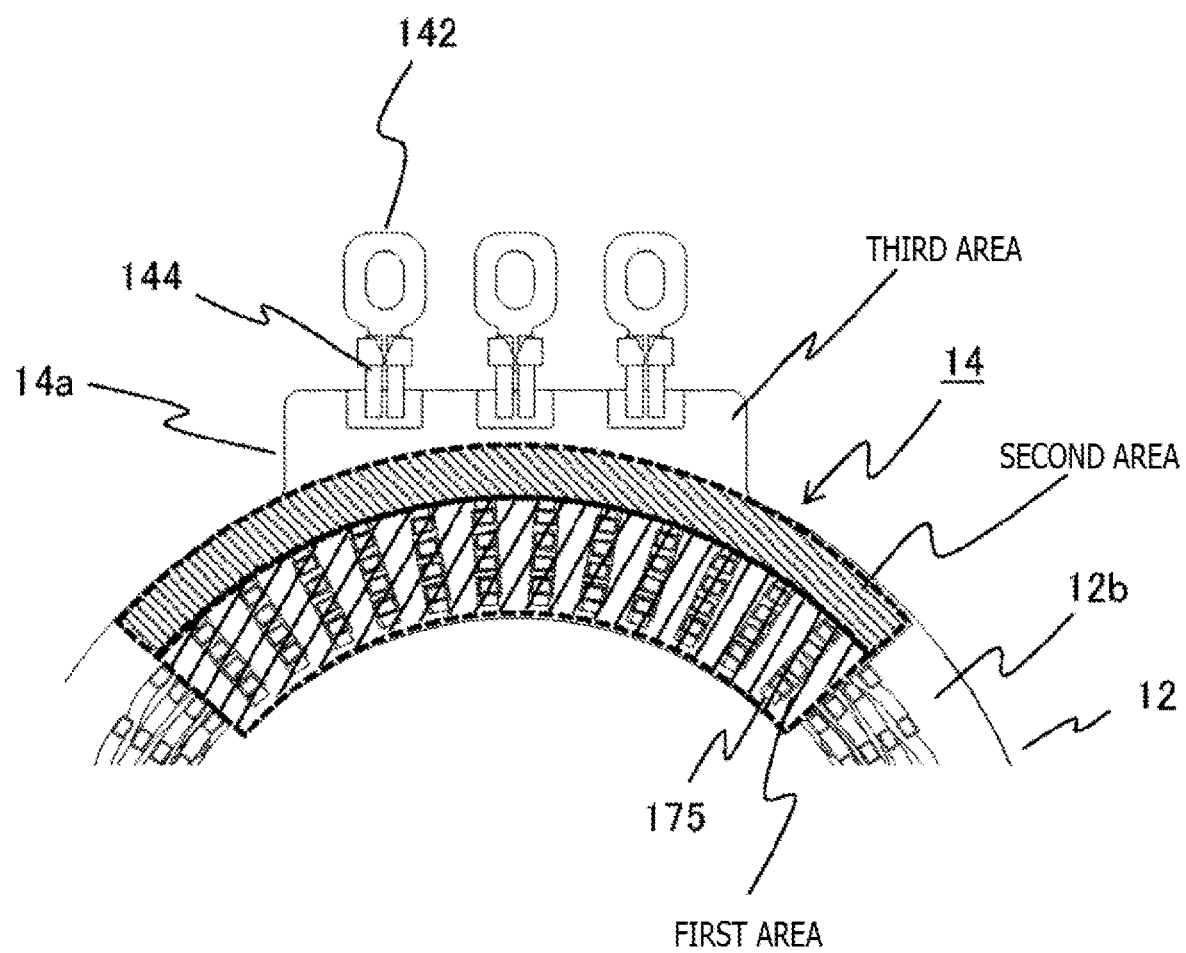
FIG. 33 is a front view showing a state in which an area of the connection board is divided in the third embodiment.

A third embodiment will be described below, referring to FIGS. 28 to 33. FIG. 28 is a perspective view of a stator 11 as viewed from a connection board side. FIG. 29 is a side view of the stator 11. FIG. 30 is a perspective view of a connection board 14. FIG. 31 is a front of the connection board 14. FIG. 32 is a layout view of connection conductors on a perspective basis through an insulating member 141 of the connection board 14. FIG. 33 is a front view showing a state in which an area of the connection board 14 is divided.

In the first embodiment, with respect to connection between the connection board 14 and the stator winding 13, a direction in which the end portions 1431 of the group of connection conductors and the U-shaped segment coil end portions 175 are adjacent to each other exists in both the circumferential direction and the radial direction, so that in producing the stator 11, connections in two directions are generated, and, therefore, the connecting operation may be complicated. In addition, while the connection of the connection board 14 can be unified into the circumferential direction in the second embodiment, the number of the same-phase connection conductors 145 is large, which leads to a high cost or complication of wiring of the group of connection conductors. In view of these problems, in the third embodiment, the number of connection conductors is reduced, and the connection between the end portions 1431 of the group of connection conductors and the U-shaped segment coil end portions 175 and the mutual connection of the U-shaped segment coil end portions 175 are made to be in the same direction, for the purpose of enhancing the productivity of the stator 11.

The third embodiment is the same as the first embodiment in the configuration ranging from mounting of the U-shaped segment coils 17 shown in FIG. 11 to the stator core 12 to twisting of the U-shaped segment coil end portions 175, but is different from the first embodiment in the configuration of the group of connection conductors of the connection board 14. The connection board 14 in the third embodiment has a configuration in which as shown in FIGS. 28 to 30, the connection board 14 with the group of connection terminals covered by the insulating member 141 is mounted on the U-shaped segment coil end portion 175 side of the stator winding 13, the U-shaped segment coil end portions 175 and the end portions 1431 of the group of connection conductors are connected, and the U-shaped segment coil end portions 175 are mutually connected.

As shown in FIG. 32, the group of connection conductors of the connection board 14 includes the input/output connection conductors 144 for connection of the stator 11 with the exterior of the rotary electric machine 1, the same-phase connection conductors 145 for connecting in the same phase, and the different-phase connection conductors 146 (in the present embodiment, corresponding to neutral points because of Y-connection) for connection between different phases. The group of connection conductors is fixed in the insulating member 141 in the state of maintaining a predetermined interval for electrical insulation.

As shown in FIGS. 28 to 30, the U-shaped segment coil end portions 175 of the stator winding 13 are passed in the axial direction through the through-holes 1411 (see FIG. 30) in the connection board 14, and the connection board 14 is mounted at a position in a first space between the segment coil end portions 175 (coil connection section 18) and the stator core end portion 12b in the axial direction shown in FIG. 29. With the connection board 14 mounted at a position in the first space, the coil end of the stator winding 13 can be suppressed to a low level, and the rotary electric machine as the present embodiment can be reduced in size.

The connection board 14 is mounted to the stator winding 13. As a result, the U-shaped segment coil end portions 175 and the end portions 1431 (see FIG. 30) of the group of connection conductors in the connection board 14 are disposed to be adjacent to each other in the radial direction.

In the present embodiment, as shown in FIG. 28, in regard of connection at other parts than the upper surface of the connection board 14, the radially adjacent U-shaped segment coil end portions 175 of inner U-shaped segment coils 17a mounted to the first layer and the second layer in the slot in the stator core 12 are mutually connected. In addition, the radially adjacent U-shaped segment coil end portions 175 of inner U-shaped segment coils 17b mounted to the third layer and the fourth layer in the slot in the stator core 12 are mutually connected.

As shown in FIG. 30, on the upper surface of the connection board 14, the end portions 1431 of the group of connection conductors in the connection board 14 are led out in the axial direction radially adjacently to the rectangular through-holes 1411. The end portions 1431 of the group of connection conductors and the U-shaped segment coil end portions 175 are radially adjacent to each other and have their end portions mutually connected, whereby an electric circuit as the stator 11 is configured.

The end portions 1431 of the group of connection conductors and the radially adjacent end portions on the radially innermost side (the first layer in the slot in the stator core 12) and on the radially outermost side (the fourth layer in the slot in the stator core 12) of the U-shaped segment coil end portions 175 are connected. In regard of the U-shaped segment coil end portions 175 not adjacent to the end portions 1431 of the group of connection conductors, the radially adjacent U-shaped segment coil end portions 175 are mutually connected, whereby an electric circuit as the stator 11 is configured.

While the method for connecting the U-shaped segment coil end portions 175 and the end portions 1431 of the group of connection conductors and for mutually connecting the U-shaped segment coil end portions 175 is TIG welding in the present embodiment, other joining methods such as laser welding, electron beam welding and ultrasonic welding can also be used.

The structure of the connection board 14 in the present embodiment will be described below, referring to FIGS. 30 to 33. As shown in FIGS. 30 to 32, the insulating member 141 of the connection board 14 is substantially fan-shaped, and, as shown in FIG. 33, it is divided into three areas on a functional basis, as viewed in the axial direction from the U-shaped segment coil end portions 175 toward the end portion 12b of the stator core 12.

As shown in FIG. 33, a first area is a part overlapping with the stator core 12, as viewed in the axial direction from the U-shaped segment coil end portions 175 toward the end portion 12b of the stator core 12, and corresponds to a position of an upper surface in regard of the axial direction of teeth 121 on the inside diameter side on the upper surface of the stator core 12.

The first area is an area where the U-shaped segment coil end portions 175 and the end portions 1431 of the group of connection conductors are connected, and where rectangular through-holes 1411 (see FIG. 32) enabling the U-shaped segment coil end portions 175 to be mounted in the state of being aligned in the radial direction are provided.

In the first area, as shown in FIG. 32, the group of connection conductors are disposed in the insulating member 141 between the rectangular through-hole 1411 and the circumferentially adjacent through-hole 1411 in the insulating member 141, are disposed adjacently along the radial direction of the through-holes 1411, and, as shown in FIG. 30, the end portions 1431 of the group of connection conductors are disposed protruding in the axial direction.

In the insulating member 141 between the through-hole 1411 and the circumferentially adjacent through-hole 1411 in the insulating member 141 in the first area, there are disposed the input/output connection conductors 144, the same-phase connection conductors 145 as connection conductors in the same phase, and the different-phase connection conductors 146 for connection between different phases, and they are connected to the U-shaped segment coil end portions 175 protruded from the through-holes 1411 in the insulating member 141. The same-phase connection conductor 145 is disposed circumferentially between the through-hole 1411 and the through-hole 1411 in the insulating member 141.

In the case of the present embodiment, the same-phase connection conductor 145 for connection between the first layer and the fourth layer in the slot in the stator core 12 is disposed, and the U-shaped segment coil end portion 175 and the radially adjacent U-shaped segment coil end portion 175 are connected by the same-phase connection conductor 145.

The input/output connection conductors 144 and the different-phase connection conductors 146 are passed from an adjacent part of a surface along the circumferential direction of the rectangular through-hole 1411 corresponding to the first layer in the slot in the stator core 12, are passed along the radial direction in the insulating member 141 located circumferentially between the through-hole 1411 and the through-hole 1411, and led out into the second area on the outside diameter side. In addition, the input/output connection conductor 144 and the different-phase connection conductor 146 are led out from an adjacent part of a surface along the circumferential direction on the outside diameter side of the through-hole 1411 to the second area on the outside diameter side.

In the next place, a second area is a part overlapping with the stator core 12, as viewed in the axial direction from the U-shaped segment coil end portions 175 toward the end portion 12b of the stator core 12. It is an area on the upper surface of a core back 123 of the stator core 12, and is located on the outside diameter side of the first area.

The different-phase connection conductor 146 connects the U-shaped segment coil end portions 175 of different phases while straddling a plurality of slots in the stator core 12. The second area is an area serving as a space for crossing the different-phase connection conductor 146 in the circumferential direction.

In addition, the second area is an area through which to pass the input/output connection conductor 144 into the third area, and it is disposed while maintaining an electrical insulating distance such as not to contact the different-phase connection conductor 146.

Since pluralities of the input/output connection conductors 144 and the different-phase connection conductors 146 are disposed in the second area, they are in grade separation with such a distance that electrical insulation is maintained in the axial direction, the insulating member 141 is formed to be long in the axial direction toward the end portion 12b of the stator core 12, and the input/output connection conductors 144 and the different-phase connection conductors 146 are covered by the insulating member 141.

In the present embodiment, the rotary electric machine 1 is configured by a Y-connection two-parallel electric circuit, so that the different-phase connection conductors 146 correspond to neutral points 1461. The different-phase connection conductors 146 configured from a U phase, a V phase and a W phase are connected at two positions, to form the neutral points 1461. Note that while the neutral points 1461 are disposed in the insulating member 141 in the present embodiment, they can be led out in the axial direction onto the upper surface of the insulating member 141 and be joined at the same timing as the joining between the group of connection terminals and the U-shaped segment coil end portions 175.

In the next place, a third area is a part not overlapping with the stator core 12, as viewed in the axial direction from the U-shaped segment coil end portions 175 toward the end portion 12b of the stator core 12, and it is disposed on the outer side than the outside diameter of the stator core 12. The third area becomes a base section 14a serving as a reference for disposing at a predetermined position for connection with the cable 16 from the exterior. Of the input/output connection conductors 144 led out from the first area through the second area, those of the same phase are once adjacently disposed in the third area. The input/output connection conductors 144 are led out from the inside of the insulating member 141 to the exterior, and are wired at predetermined positions for connection with the cable 16 from the exterior.

In the present embodiment, as shown in FIG. 32, the input/output connection conductors 144 led out from the first area are passed from the first area through the second area such as to be a U phase, a V phase and a W phase from the left side in the figure and are disposed in the third area such that those of the same phase are adjacent. As shown in FIG. 29, the input/output connection conductor 144 is led out in such a direction as to be spaced away in the axial direction from the stator core 12 on the outer side than the insulating member 141, is then bent, and is led out to the outside diameter side in the radial direction. An input/output connection terminal 142 is connected to an end portion of the input/output connection conductor 144.

The third area is an area where the input/output connection conductors 144 of the same phase are collected together and where each phase is disposed at a predetermined position. Besides, the connection board 14 is a part which becomes a reference base for the position of connection of the cable 16 with the exterior and at which restriction in the axial direction and the radial direction is made such as not to be damaged or broken due, for example, to vibrations on the vehicle side. In addition, since the connection board 14 and the stator winding 13 are connected at the coil connection section 18, reliability of disposing is enhanced by fixing the base section 14a in the third area to the center housing 2 as shown in FIG. 1.

In the present embodiment, the position of connection with the cable 16 has been located in such a direction as to be spaced away from the end portion 12b of the stator core 12 in the axial direction and in such a direction as to be spaced away from the center in the radial direction, as compared to the position of connection between the stator winding 13 and the connection board 14 at an upper portion in regard of the axial direction; since the cable position differs from vehicle to vehicle, however, the position of connection with the cable 16 can be disposed at various positions depending on the way in which the input/output connection terminal 142 is led out starting from the base section 14a in the third area.

In the present embodiment as above, the number of the same-phase connection conductors 145 can be minimized. While the number of conductors in the stator core 12 is explained to be four in the present embodiment, a similar effect can also be obtained even when the number of conductors in the slot is changed to six, eight, ten or the like.

For example, in the case where the number of conductors is six, the input/output connection conductor 144 of the connection board 14 and the different-phase connection conductor 146 are connected to the U-shaped segment coil end portions 175 of the first layer and the sixth layer (outermost layer) in the slot in the stator core 12, and are led out to the second area. The same-phase connection conductor 145 constitutes a connection conductor for mutually connecting the circumferentially adjacent U-shaped segment coil end portions 175 of the first layer and the sixth layer (outermost layer) in the slot in the stator core 12.

In regard of other parts than the parts of connection between the U-shaped segment coil end portions 175 and the group of connection conductors, the adjacent U-shaped segment coil end portions 175 are mutually connected, whereby an electric circuit can be configured; the U-shaped segment coil end portions 175 of the second layer and the third layer in the slot in the stator core 12 are mutually connected, and the U-shaped segment coil end portions 175 of the fourth layer and the fifth layer are mutually connected, whereby an electric circuit is configured, to form the stator 11. Even when the number of conductors in the slot is changed to six, the number of kinds of the connection conductors of the connection board 14 is not increased, and the connection board 14 can be configured with a minimum number of connection conductors of the same kind as that in the case where the number of conductors in the slot is four, the same being applicable also when the number of conductors in the slot is changed to eight, ten or the like.

In the present embodiment, the wiring of the group of connection conductors is an example of a stator 11 of an 8-pole, 3-phase, 48-slot rotary electric machine 1 with four conductors in each slot, which may vary depending on the specifications of the rotary electric machine and/or layout of conductor wires of each phase in the slot.

According to the present embodiment, the height of the coil end portion of the stator winding and the number of kinds of the stator winding can be minimized, and it is possible to provide a rotary electric machine which is high in productivity, small in size and high in output.

As has been described in the first to third embodiments, according to the present invention, the height of the coil end portion is reduced and the number of kinds of the stator winding is minimized, and it is possible to provide a rotary electric machine which is high in productivity, small in size and high in output.

Note that the present invention is not limited to the above-described embodiments, but includes various modifications. For example, while the stator in the present embodiments has a structure configured in Y-connection, a similar effect can be obtained also with a configuration of A-connection. In addition, while the stator in the present embodiments is of three-phase winding, the present invention is also applicable to three-phase, five-phase and seven-phase windings and to two sets of three-phase windings, whereby the same effect as that described in the embodiments can be obtained.

According to the above-described embodiments, the following operation and effect can be obtained.

(1) The rotary electric machine 1 includes the stator core 12, the stator winding 13 including the plurality of segment coils 17, and the connection board 14 that fixes the different-phase connection conductors 146 for connection of different phases of the segment coils 17 of the stator winding 13 and the same-phase connection conductors 145 for connection of the segment coils 17 of the same phase of the stator winding 13. The stator winding 13 has, on one side with respect to the axial direction of the stator core 12, the coil connection section 18 where end portions of the plurality of segment coils 17 are connected, and the connection board 14 is disposed on that side of the stator core 12 on which the coil connection section 18 is disposed. Consequently, the number of kinds of the segment coils 17 of the stator winding 13 can be minimized, and it is possible to provide a rotary electric machine 1 including a stator which contributes to a reduction in size of the rotary electric machine and is excellent in productivity.

The present invention is not limited to the above-described embodiments, and other modes conceivable within the scope of the technical thought of the invention are also included in the scope of the invention, unless spoiling the features of the invention. In addition, configurations obtained by combining the above-described embodiments may also be adopted.

DESCRIPTION OF REFERENCE CHARACTERS

1: Rotary electric machine
2: Center housing
3: Front bracket
4: Rear bracket
5: Rotor
6: Rotor core
7: Permanent magnet
8: Shaft
9: Front bearing
10: Rear bearing
11: Stator
12: Stator core
121: Teeth
122: Slot
123: Core back 12a: End face on U-shape segment coil mount-shaped portion side of stator core
12b: End face on U-shape3d segment coil end portion side of stator core
13: Stator winding
14: Connection board
141: Insulating member
14a: Base section
1413: Connection conductor accommodation section
1414: Connection section
142: Connection terminal
143: Group of connection conductors
1431: End portion of group of connection conductors
144: Input/output connection conductor
145: Same-phase connection conductor
146: Different-phase connection conductor
1461: Neutral point
15: Insulating paper
16: Cable
17: U-shaped segment coil
171: First rectilinear portion of U-shaped segment coil
172: Second rectilinear portion of U-shaped segment coil
173: Mount-shaped portion of U-shaped segment coil
174: Head portion of U-shaped segment coil
175: End portion of U-shaped segment coil
1751: First end portion of U-shaped segment coil
1752: Second end portion of U-shaped segment coil
17a: Inside diameter side U-shaped segment coil
17b: Outside diameter side U-shaped segment coil
18: Coil connection section

The invention claimed is:

1. A rotary electric machine comprising:
a stator core;
a stator winding including a plurality of segment coils; and
a connection board that fixes a different-phase connection conductor adapted to connect different phases of segment coils of the stator winding and a same-phase connection conductor adapted to connect segment coils of the same phase of the stator winding,
wherein the stator winding has, on one side with respect to an axial direction of the stator core, a coil connection section where end portions of the plurality of segment coils are connected to each other, and
the connection board is disposed on a side on which the coil connection section is disposed, with respect to the stator core.

2. The rotary electric machine according to claim 1, wherein the connection board is formed with a through-hole through which end portions of the segment coils are passed, and is disposed in a first space between the coil connection section of the segment coils passed through the through-hole and an end portion of the stator core, with respect to the axial direction of the stator core.

3. The rotary electric machine according to claim 2, including:
an input/output connection conductor that is fixed to the connection board, is connected to the segment coils and functions for inputting/outputting of a current to an exterior of the rotary electric machine,
wherein the input/output connection conductor located on inside of an outside diameter of the stator core is disposed in the first space.

4. The rotary electric machine according to claim 1, including:
an input/output connection conductor that is fixed to the connection board, is connected to the segment coils and functions for inputting/outputting of a current to the exterior of the rotary electric machine,
wherein the connection board located on outside of an outside diameter of the stator core has a base section that supports part of the input/output connection conductor.

5. The rotary electric machine according to claim 1, wherein the plurality of segment coils have their mutually connected end portions aligned in a radial direction of the stator core, and
the connection board is formed with a through-hole through which the mutually connected end portions of the segment coils are passed.

6. The rotary electric machine according to claim 3, wherein the input/output connection conductor located on inside of an outside diameter of the stator core is connected to radial-direction surfaces of the segment coils corresponding to the radial direction of the stator core.

7. The rotary electric machine according to claim 6, wherein the input/output connection conductor located on inside of an outside diameter of the stator core is disposed between the plurality of segment coils aligned in a circumferential direction of the stator core.

8. The rotary electric machine according to claim 6, wherein the input/output connection conductor located on outside of the outside diameter of the stator core is bent in such a direction as to be spaced away from the stator core, and is disposed at a position farther from the stator core than the different-phase connection conductor and the same-phase connection conductor.

9. The rotary electric machine according to claim 6, wherein the input/output connection conductor is disposed at a position nearer to the stator core than the different-phase connection conductor and the same-phase connection conductor.

10. The rotary electric machine according to claim 2, wherein end portions of the different-phase connection conductor and the same-phase connection conductor which are fixed to the connection board are disposed in a state of being led in an axial direction adjacently in a circumferential direction to the through-hole of the connection board, and
end portions of the connection conductors of the connection board and segment coil end portions of the stator winding are adjacent to each other in the circumferential direction and are mutually connected.

11. The rotary electric machine according to claim 2, wherein end portions of the different-phase connection conductor and the same-phase connection conductor which are fixed to the connection board are disposed in a state of being led in an axial direction adjacently in a radial direction to the through-hole of the connection board, and
end portions of the connection conductors of the connection board and segment coil end portions of the stator wiring are adjacent to each other in the radial direction and are mutually connected.

12. The rotary electric machine according to claim 2, including:
an input/output connection conductor that is fixed to the connection board, is connected to the segment coils and functions for inputting/outputting of a current to the exterior of the rotary electric machine, wherein the connection board located on outside of an outside diameter of the stator core has a base section that supports part of the input/output connection conductor.

* * * * *